(12) United States Patent
Dahms et al.

(10) Patent No.: US 8,992,654 B2
(45) Date of Patent: Mar. 31, 2015

(54) HIGH VALUE ORGANIC-ENHANCED INORGANIC FERTILIZERS

(75) Inventors: Gary L. Dahms, Soda Springs, ID (US); James P. Carr, Bradenton, FL (US); Jeffrey C. Burnham, Beech Island, SC (US); Barry R. Jarrett, Olive Branch, MS (US)

(73) Assignee: VitAg Corporation, Beech Island, SC (US)

( * ) Notice: Subject to any disclaimer, the term of this patent is extended or adjusted under 35 U.S.C. 154(b) by 162 days.

(21) Appl. No.: 13/432,709

(22) Filed: Mar. 28, 2012

(65) Prior Publication Data

US 2012/0247164 A1    Oct. 4, 2012

Related U.S. Application Data

(60) Provisional application No. 61/615,258, filed on Mar. 24, 2012, provisional application No. 61/569,007, filed on Dec. 9, 2011, provisional application No. 61/468,157, filed on Mar. 28, 2011.

(51) Int. Cl.
   *C05F 3/00* (2006.01)
   *C05F 7/00* (2006.01)
   (Continued)

(52) U.S. Cl.
   CPC ......... *C05D 9/02* (2013.01); *B01J 2219/00006* (2013.01); *C05D 3/00* (2013.01); *B01J 2/006* (2013.01); *B01J 2/12* (2013.01)
   USPC ................ 71/11; 71/12; 71/13; 71/14; 71/15; 71/17; 71/21; 71/22; 71/25; 71/64.03

(58) Field of Classification Search
   USPC ...................................................... 71/11–30
   See application file for complete search history.

(56) References Cited

U.S. PATENT DOCUMENTS

| 2,026,969 A | 1/1936 | Flynn |
| 2,568,901 A | 9/1951 | Stengel |

(Continued)

FOREIGN PATENT DOCUMENTS

| DE | 2523628 | 12/1976 |
| DE | 2800915 | 9/1978 |

(Continued)

OTHER PUBLICATIONS

U.S. Appl. No. 08/520,959, Burnham; Jeffrey C.

(Continued)

*Primary Examiner* — Jennifer A Smith
(74) *Attorney, Agent, or Firm* — Remenick PLLC

(57) ABSTRACT

The invention is directed to manufacture of fertilizer having commercial levels of nitrogen supplemented with organic substances. The process treats organic matter with acid causing hydrolysis of organic polymers after which the mix is injected with nitrogen. The resultant sterilized and liquefied organic matter is disbursed over recycled material for the production of granules. Because the process allows for the controlled addition of acids and ammonia, desired levels of components can be achieved. The process is scalable, odor controlled and safe thereby allowing for the location of biosolid processing facilities in most any location. Further, the fertilizer of the invention provides a dual nitrogen-release profile when applied to crops. After application to soil, fertilizer of the invention releases an immediate bolus of nitrogen, similar to traditional ammonium sulfate, followed by continued slow release of nitrogen typically over a season.

40 Claims, 11 Drawing Sheets

(51) Int. Cl.
  *C05F 9/00* (2006.01)
  *C05F 11/00* (2006.01)
  *C05D 9/02* (2006.01)
  *C05D 3/00* (2006.01)
  *B01J 2/00* (2006.01)
  *B01J 2/12* (2006.01)

(56) References Cited

U.S. PATENT DOCUMENTS

| | | |
|---|---|---|
| 2,755,176 A | 7/1956 | Pearce et al. |
| 2,800,457 A | 7/1957 | Green et al. |
| 2,800,458 A | 7/1957 | Green |
| 2,902,342 A | 9/1959 | Rehfeld |
| 3,050,383 A | 8/1962 | Paden et al. |
| 3,259,482 A | 7/1966 | Hansen |
| 3,264,088 A | 8/1966 | Hansen |
| 3,264,089 A | 8/1966 | Hansen |
| 3,304,588 A | 2/1967 | McIlvaine |
| 3,345,288 A | 10/1967 | Sontheimer |
| 3,475,154 A | 10/1969 | Kato |
| 3,476,683 A | 11/1969 | Liljeren |
| 3,655,395 A | 4/1972 | Karnemaat |
| 3,756,784 A | 9/1973 | Pittwood |
| 3,796,669 A | 3/1974 | Kiritani et al. |
| 3,837,872 A | 9/1974 | Conner |
| 3,915,853 A | 10/1975 | Luck |
| 3,939,280 A | 2/1976 | Karnemaat |
| 3,942,970 A | 3/1976 | O'Donnell |
| 3,960,718 A | 6/1976 | Lebo |
| 3,966,450 A | 6/1976 | O'Neill et al. |
| 4,001,140 A | 1/1977 | Foris et al. |
| 4,076,515 A | 2/1978 | Rickard |
| 4,079,003 A | 3/1978 | Manchak |
| 4,100,103 A | 7/1978 | Foris et al. |
| 4,108,771 A | 8/1978 | Weiss |
| 4,124,405 A | 11/1978 | Quienot |
| 4,134,750 A | 1/1979 | Norton et al. |
| 4,154,593 A | 5/1979 | Brown et al. |
| 4,180,459 A | 12/1979 | Zievers |
| 4,219,347 A | 8/1980 | Young |
| 4,230,568 A | 10/1980 | Chappell |
| 4,249,929 A | 2/1981 | Kneer |
| 4,270,279 A | 6/1981 | Roediger |
| 4,304,588 A | 12/1981 | Moore, Jr. |
| 4,306,978 A | 12/1981 | Wurtz |
| 4,377,406 A | 3/1983 | Achorn et al. |
| 4,377,486 A | 3/1983 | Barrick et al. |
| 4,405,354 A | 9/1983 | Thomas, II et al. |
| 4,454,259 A | 6/1984 | Reischl et al. |
| 4,500,428 A | 2/1985 | Lynch et al. |
| 4,514,307 A | 4/1985 | Chestnut et al. |
| 4,519,831 A | 5/1985 | Moore |
| 4,541,986 A | 9/1985 | Schwab et al. |
| 4,554,002 A | 11/1985 | Nicholson |
| 4,601,863 A | 7/1986 | Shioi et al. |
| 4,619,684 A | 10/1986 | Salladay et al. |
| 4,655,932 A | 4/1987 | Roslonski |
| 4,659,472 A | 4/1987 | Nordlund et al. |
| 4,711,659 A | 12/1987 | Moore |
| 4,743,287 A | 5/1988 | Robinson |
| 4,772,490 A | 9/1988 | Kogler et al. |
| 4,781,842 A | 11/1988 | Nicholson |
| 4,792,349 A | 12/1988 | Trimm et al. |
| 4,793,927 A | 12/1988 | Meehan et al. |
| 4,902,431 A | 2/1990 | Nicholson et al. |
| 4,966,706 A | 10/1990 | Gregor |
| 4,997,572 A | 3/1991 | Wurtz |
| 5,013,458 A | 5/1991 | Christy, Sr. et al. |
| 5,051,031 A | 9/1991 | Schumacher et al. |
| 5,087,375 A | 2/1992 | Weinwurm |
| 5,102,556 A * | 4/1992 | Wong ............................ 210/711 |
| 5,118,337 A | 6/1992 | Bleeker |
| 5,125,951 A | 6/1992 | Lahoda et al. |
| 5,135,664 A | 8/1992 | Burnham |
| 5,147,563 A | 9/1992 | Long, Jr. et al. |
| 5,183,577 A | 2/1993 | Lehmann |
| 5,238,480 A | 8/1993 | Rehberg et al. |
| 5,252,116 A | 10/1993 | Markham et al. |
| 5,259,977 A | 11/1993 | Girovich et al. |
| 5,275,733 A | 1/1994 | Burnham |
| 5,340,376 A | 8/1994 | Cunningham |
| 5,342,442 A | 8/1994 | Nechvatal et al. |
| 5,346,527 A | 9/1994 | Rehbein et al. |
| 5,356,540 A | 10/1994 | Khan et al. |
| 5,385,673 A | 1/1995 | Fergen |
| 5,393,317 A | 2/1995 | Robinson |
| 5,401,402 A | 3/1995 | Christy et al. |
| 5,409,605 A | 4/1995 | Haley et al. |
| 5,417,861 A | 5/1995 | Burnham |
| 5,419,839 A | 5/1995 | Haley et al. |
| 5,422,015 A | 6/1995 | Angell et al. |
| 5,435,923 A | 7/1995 | Girovich |
| 5,443,613 A | 8/1995 | Robinson |
| 5,466,273 A | 11/1995 | Connell |
| 5,500,044 A | 3/1996 | Meade et al. |
| 5,554,279 A | 9/1996 | Christy |
| 5,556,445 A | 9/1996 | Quinn et al. |
| 5,580,458 A | 12/1996 | Yamasaki et al. |
| 5,593,590 A | 1/1997 | Steyskal |
| 5,593,591 A | 1/1997 | Ohsol et al. |
| 5,603,842 A | 2/1997 | Whitaker et al. |
| 5,618,442 A | 4/1997 | Christy |
| 5,635,069 A | 6/1997 | Boss et al. |
| 5,669,969 A | 9/1997 | Meade et al. |
| 5,679,129 A | 10/1997 | Hon |
| 5,681,481 A | 10/1997 | Christy et al. |
| 5,733,355 A | 3/1998 | Hibino et al. |
| 5,766,302 A | 6/1998 | Lefroy et al. |
| 5,772,721 A | 6/1998 | Kazemzadeh |
| 5,783,073 A | 7/1998 | Christy et al. |
| 5,807,724 A | 9/1998 | Resnick |
| 5,849,060 A | 12/1998 | Diping et al. |
| 5,853,450 A | 12/1998 | Burnham et al. |
| 5,853,590 A | 12/1998 | Burnham |
| 5,862,610 A | 1/1999 | Lipert |
| 5,876,613 A | 3/1999 | Bonnin et al. |
| 5,906,750 A | 5/1999 | Haase |
| 5,916,448 A | 6/1999 | Fergen |
| 5,984,992 A | 11/1999 | Greer et al. |
| 5,993,505 A | 11/1999 | Tijsma et al. |
| 6,051,411 A | 4/2000 | Turtakovsky et al. |
| 6,103,191 A | 8/2000 | Luker |
| 6,117,406 A | 9/2000 | Vogel et al. |
| 6,159,263 A | 12/2000 | Greer et al. |
| 6,165,550 A | 12/2000 | Markusch et al. |
| 6,176,891 B1 | 1/2001 | Komoriya et al. |
| 6,187,074 B1 | 2/2001 | von Locquenghien et al. |
| 6,237,246 B1 | 5/2001 | Millard |
| 6,237,264 B1 | 5/2001 | Gulick, Jr. |
| 6,256,902 B1 | 7/2001 | Flaherty et al. |
| 6,284,278 B1 | 9/2001 | Waldman et al. |
| 6,325,035 B1 | 12/2001 | Codina et al. |
| 6,331,300 B1 | 12/2001 | Dybas et al. |
| 6,398,840 B1 | 6/2002 | Orta-Castro et al. |
| 6,406,510 B1 | 6/2002 | Burnham |
| 6,409,788 B1 | 6/2002 | Sower |
| 6,409,789 B1 | 6/2002 | Gilbert |
| 6,461,399 B1 | 10/2002 | Connell |
| 6,465,706 B1 | 10/2002 | Rogers et al. |
| 6,517,599 B2 | 2/2003 | Gilbert |
| RE38,238 E | 8/2003 | Nicholson et al. |
| 6,623,650 B2 | 9/2003 | Millard |
| 6,666,154 B2 | 12/2003 | Logan et al. |
| 6,716,360 B2 | 4/2004 | Titmas |
| 6,752,848 B2 | 6/2004 | Logan et al. |
| 6,752,849 B2 | 6/2004 | Logan et al. |
| 6,758,879 B2 | 7/2004 | Greer et al. |
| 6,841,515 B2 | 1/2005 | Burnham |
| 6,852,142 B2 | 2/2005 | Varshovi |
| 6,966,941 B1 | 11/2005 | Grobler et al. |
| 7,128,880 B2 | 10/2006 | Dahms et al. |
| 7,497,956 B2 | 3/2009 | Blais et al. |
| 7,513,927 B2 | 4/2009 | Faulmann et al. |

(56) References Cited

U.S. PATENT DOCUMENTS

| | | |
|---|---|---|
| 7,604,742 B2 | 10/2009 | Shankar et al. |
| 7,662,205 B2 | 2/2010 | Burnham |
| 7,662,206 B2 | 2/2010 | Burnham |
| 7,789,931 B2 | 9/2010 | Burnham et al. |
| 7,947,104 B2 | 5/2011 | Burnham et al. |
| 7,947,105 B2 | 5/2011 | Burnham |
| 8,057,569 B2 | 11/2011 | Burnham et al. |
| 8,105,413 B2 | 1/2012 | Burnham |
| 2002/0098982 A1 | 7/2002 | Burnham |
| 2002/0157439 A1 | 10/2002 | Gilbert |
| 2003/0070460 A1 | 4/2003 | Logan et al. |
| 2003/0089151 A1 | 5/2003 | Logan |
| 2003/0121302 A1 | 7/2003 | Oliver et al. |
| 2003/0136165 A1 | 7/2003 | Logan et al. |
| 2004/0065127 A1 | 4/2004 | Connell |
| 2004/0177664 A1 | 9/2004 | Hale |
| 2004/0016731 A1 | 12/2004 | Burnham et al. |
| 2005/0005660 A1 | 1/2005 | Burnham et al. |
| 2005/0019207 A1 | 1/2005 | Oliver et al. |
| 2005/0039508 A1 | 2/2005 | Burnham |
| 2005/0138978 A1 | 6/2005 | Porubcan |
| 2006/0243009 A1 | 11/2006 | Burnham |
| 2006/0254331 A1* | 11/2006 | Burnham ................. 71/11 |
| 2007/0257715 A1 | 11/2007 | Semerdzhiev |
| 2008/0000279 A1 | 1/2008 | Faulmann et al. |
| 2008/0034822 A1 | 2/2008 | Burnham et al. |
| 2008/0230484 A1 | 9/2008 | Burnham et al. |
| 2010/0139345 A1 | 6/2010 | Burnham |
| 2010/0139346 A1 | 6/2010 | Burnham |
| 2010/0288003 A1 | 11/2010 | Burnham et al. |

FOREIGN PATENT DOCUMENTS

| | | |
|---|---|---|
| DE | 4127459 | 2/1993 |
| EP | 0143392 | 6/1985 |
| EP | 0356781 | 3/1990 |
| EP | 0557078 | 8/1993 |
| EP | 0770586 | 5/1997 |
| FR | 2133115 | 11/1972 |
| FR | 2757504 | 6/1998 |
| JP | 58032638 | 2/1983 |
| JP | 9110570 | 4/1997 |
| JP | 2001129597 | 5/2001 |
| JP | 2002248454 | 3/2002 |
| WO | WO 8102888 | 10/1981 |
| WO | WO9856735 | 12/1998 |
| WO | WO9947282 | 9/1999 |
| WO | WO0136082 | 5/2001 |
| WO | WO0136887 | 5/2001 |
| WO | WO0168562 | 9/2001 |
| WO | WO0169150 | 9/2001 |
| WO | WO 03045852 | 6/2003 |
| WO | WO 2004094320 | 11/2004 |

OTHER PUBLICATIONS

U.S. Appl. No. 08/532,273, Burnham; Jeffrey C.
U.S. Appl. No. 10/854,677, filed Feb. 24, 2005, Burnham.
U.S. Appl. No. 13/472,828, Burnham.
U.S. Appl. No. 13/104,127, filed Nov. 3, 2011, Burnham.
U.S. Appl. No. 12/981,933, filed Jun. 30, 2011, Burnham.
U.S. Appl. No. 13/349,967, Burnham.
U.S. Appl. No. 60/654,957, Burnham.
U.S. Appl. No. 60/659,434, Burnham.
U.S. Appl. No. 60/700,730, Burnham.
U.S. Appl. No. 60/704,458, Burnham.
AU Exam Report for PCT/US06/036085, dated Jan. 20, 2011.
CA Exam Report for PCT/US06/08536, dated Dec. 9, 2011.
CA Exam Report for PCT/US06/08536, dated Mar. 28, 2011.
AU Exam Report for PCTUS08054315, dated Jul. 5, 2010.
JP Exam Report for PCTUS08054315, dated Dec. 21, 2010.
AU Exam Report for PCTUS08054315, dated Nov. 23, 2010.
CA Exam Report for PCTUS08054315, dated May 10, 2011.
CA Exam Report for PCT/US2008/54315, dated Feb. 9, 2012.
CA Exam Report for PCT 2006/36085 dated Oct. 22, 2012.
PCT Written Opinion for PCT/US12/30895, dated Sep. 17, 2012.
CO Office Action for PCT/US12/30895, dated Sep. 2, 2014.

* cited by examiner

ORGANICALLY MODIFIED AMMONIUM SULFATE FERTILIZER
PHYSICAL AND CHEMICAL CHARACTERISTICS

GRANULAR
HIGH HARDNESS
LOW MOISTURE
DUST FREE
NON-COMBUSTIBLE
PATHOGEN FREE
ABRASION RESISTANT
LOW METAL CONCENTRATIONS
ORGANIC - 7 TO 14%
NITROGREN - 16 TO 18%
PHOSPHORUS - 0 TO 1%
POTASSIUM - 0 TO 2%
SULFUR - 17 TO 20%
IRON - 2 TO 3%

*FIG. 4*

HIGH VALUE ORGANIC-ENHANCED INORGANIC FERTILIZERS

REFERENCE TO RELATED APPLICATIONS

This application claims priority to U.S. Provisional Application No. 61/468,157 filed Mar. 28, 2011, U.S. Provisional Application No. 61/569,007 filed Dec. 9, 2011, and U.S. Provisional Application No. 61/615,258 filed Mar. 24, 2012, all of the same title and all of which are specifically and entirely incorporated by reference.

BACKGROUND

1. Field of the Invention

This invention is directed to methods, systems, and processes for the manufacturing of fertilizer and the fertilizer product manufactured by these methods. In particular, the invention is also directed to the manufacture of fertilizers with predetermined concentrations or absences of nitrogen, phosphate and/or potassium.

2. Description of the Background

Sludge today is estimated to be produced at a rate of over 8 million dry metric tons annually or roughly about 64 dry pounds of biosolids for every individual in the United States. The term sludge has been replaced with the term biosolid which includes all forms of municipal wastes such as, for example, domestic septage, farm and factory organic wastes that are collected or otherwise find their way to waste-water treatment, sewer run offs, pharmaceutical wastes including fermentation and processing wastes, microbial digests, food wastes and food byproducts, animal manures, digested animal manures, organic sludge, organisms and microorganisms and all combinations thereof. Most all industrial wastes find their way into municipal sludge or are otherwise disposed of in landfills or as may be common in the particular industry. As can be envisioned, all forms of discarded material can and typically do wind up in municipal sludge including biologically-active molecules such as pharmaceuticals as well as their metabolized products, paper, plastics, metals and most all forms of garbage.

Biosolids are collected typically by municipalities through existing infrastructures such as sewers and other types of residential and industrial plumbing systems. Collected material is sent to one or more central facilities referred to as waste-water treatment plants. At these plants water is separated from the solids and sent through purification procedures for reclamation. The solids are either burned or transported by truck for burial or by barge for dumping into the ocean. Burning or incineration has become more common in part because of the awareness the dangers of unprocessed biosolids. In all biosolids are assumed to be not only harmful chemicals but also bioactive compounds, and pathogens. Federal, state and local regulations exist that strictly control the handling of biosolids for the safety of both workers and the public. But whether burned or buried, such procedures are highly inefficient and extremely costly.

Burning destroys most of the harmful materials present in the biosolids, but the cost in damage to the environment is always tremendous. Incinerators have been built specifically to deal with municipal waste. These incinerators create huge amounts of contaminated smoke spoiling the air within hundreds of square miles around the facility. The smoke that's emitted contains whatever contaminants as were present in the biosolids such as metals and other non-combustible components. Those contaminants settle onto fields and bodies of water creating ecological nightmares around the plants and sometimes for great distances down-wind of the plants. Although burning can produce energy, energy production is highly inefficient requiring huge amounts of biosolids to become cost effective. The amount of energy produced is always small in comparison to the amount of material incinerated. Even after burning, enormous amounts of soot remain that must be removed and disposed. As compared to the original biosolid, the soot is devoid of any positive impact to the environment whatsoever and is simply and unceremoniously buried or dumper into the ocean. Overall burning negatively increases the impact of biosolid disposal to the environment and for many years into the future.

Biosolids that have been treated to some degree of processing are classified according to federal standards established by the United States Environmental Protection Agency as Class A or Class B. "Class A" biosolids are considered free of detectable pathogens and sufficiently safe as a fertilizer for animal or human crop usage. Pathogens such as, for example, *Salmonella* sp. bacteria, fecal coliform indicator bacteria, enteric viruses, and viable helminth ova are below detectable levels. When pathogens can be detected in the biosolids, the USEPA has classed such treated biosolids as "Class B" implying that they are of a lower standard than the "Class A" treated biosolids. Because Class B biosolids contain pathogen indicators—and therefore potential pathogens, they are restricted in the manner by which they can be applied to animal and human crops.

The Part 503 rule (Title 40 of the Code of Federal Regulations, Part 503, incorporated herein by reference) lists six alternatives for treating biosolids so they can be classified in Class A with respect to pathogens. Alternative 1 requires biosolids to be subjected to one of four time-temperature regimes. Alternative 2 requires that biosolids processing meets pH, temperature and air-drying requirements. Alternative 3 requires that when biosolids are treated in other processes, it must be demonstrated that the process can reduce enteric viruses and viable helminthes ova, and operating conditions used in the demonstration after pathogen reduction demonstration is completed must be maintained. Alternative 4 requires that when treated in unknown processes, biosolids be tested for pathogens at the time the biosolids are used or disposed or, in certain situations, prepared for use or disposal. Alternative 5 requires that biosolids be treated in one of the Processes to Further Reduce Pathogens. Alternative 6 requires that biosolids be treated in a process equivalent to one of the Processes to Further Reduce Pathogens, as determined by the permitting authority.

Class A pathogen biosolids must also possess a density of fecal coliform of less than 1,000 most probable numbers (MPN) per gram total solids (dry-weight basis) or a density of *Salmonella* sp. bacteria of less than 3 MPN per 4 grams of total solids (dry-weight basis). Either of these two requirements must be met at one of the following times: when the biosolids are used or disposed; when the biosolids are prepared for sale or give-away in a bag or other container for land application; or when the biosolids or derived materials are prepared to meet the requirements for Exceptional Quality biosolids.

All biosolids applied to the land must meet the ceiling concentration for pollutants, comprising ten heavy metal pollutants: arsenic, cadmium, chromium, copper, lead, mercury, molybdenum, nickel, selenium, and zinc. If a limit for any one of these is exceeded, the biosolids cannot be applied to the land without the incorporation of significant restrictions. Exceptional Quality (EQ) is a term used by the USEPA Guide Part 503 Rule 7 to characterize biosolids that meet low-pollutant and Class A pathogen reduction (virtual absence of pathogens) limits and that have a reduced level of degradable compounds that attract vectors.

Biosolids that are merely dried have several disadvantages for agricultural use. Biosolids have a low fertilization value, typically having nitrogen content of only about two to five percent. Volume is large and costs per unit of nitrogen are high. The heat-dried biosolids often have a disagreeable odor, particularly when moist. Also, dried pellets have low density and hardness and when blended with other commercial fertilizer materials, the pellets may segregate, and disintegrate and may not spread on the field uniformly with other more dense ingredients. The disagreeable odor associated with the use of biosolids, unless adequately treated, will continue to be present during further processing of a nitrogen rich fertilizer product, and can continue to be present in the final product. This complicates the placement of suitable fertilizer processing plants to locations that are not in close proximity to residential communities. Additionally, the longer distance that biosolids must be transported adds to the cost and logistics of disposing of this waste product. Another disadvantage to current biosolids-enhanced fertilizers is that bacterial action may continue when the material becomes moist, and under storage conditions, the material's temperature may rise to the point of auto-ignition. Hence, except for special markets that value its organic content for soil amendment or filler in blended fertilizer, there is relatively poor demand for the heat-dried biosolids product. In many cases municipalities must pay freight charges, or may offer other incentives for commercial growers to use the material. However, this is frequently still more economical than alternative disposal schemes.

The market value for agricultural fertilizers is principally based on their nitrogen content. A need exists for a practical, safe and economic method for increasing the nitrogen content of biosolids to a level approaching that of commercial mineral fertilizers, e.g., eight to twenty two percent. If such a biosolids fertilizer could be manufactured then the overall value of the biosolids product and demand for the product would likely increase. Moreover, a properly manufactured biosolids fertilizer will have an advantage in that much of its nitrogen will be of the slow release type. Slow-release or controlled release fertilizer is one in which the nutrient, e.g., nitrogen as in ammonium ions, phosphate and/or sulfate, becomes available in the soil column at rates slower than fast-available nutrients as from traditional fertilizers such as urea, ammonium sulfate and diammonium phosphate. This slower action and/or prolonged availability of the nutrient in the soil column is very desirable and provides nutrients to the plant throughout the plant growing cycle with the implication that less nitrogen needs to be applied to the soil or crop thereby reducing the potential of environmental contamination and reducing the cost of fertilizer usage. Traditional inorganic manufactured slow release nitrogen fertilizers have a price many times that of ordinary mineral nitrogen fertilizers. Under the scenario of high nitrogen biosolids-containing fertilizer production from their biosolids, municipalities would enjoy public and regulatory support for their biosolids disposition program. Such a program would ensure the regular removal of their dewatered or dried biosolids, for example, by recycling biosolids into a high nitrogen fertilizer which then can be sold directly into the mature national fertilizer distribution industry, thereby eliminating one of the major problems traditionally associated with biosolids treatment programs.

Prior attempts have been made to reach some of these objectives. U.S. Pat. Nos. 3,942,970, 3,655,395, 3,939,280, 4,304,588, and 4,519,831 describe processes for converting sewage biosolids to fertilizer. In each of these processes a urea/formaldehyde condensation product is formed in situ with the biosolids. Thus, the processes require the handling of formaldehyde, a highly toxic lachrymator and suspected cancer-causing agent.

Other processes require costly process equipment and/or special conditions not readily incorporated in existing sewage treatment facilities (see, Japanese Patent No. 58032638; French Patent No. 2,757,504).

A simple method for increasing the nitrogen in biosolids would be to blend commercial nitrogen fertilizer materials to the wet biosolids prior to drying and pelletizing. There are only a few high-nitrogen fertilizer materials that are economical for use in agriculture. Examples include: ammonia (82 wt. percent N), urea (46 wt. percent N), and ammonium nitrate (33.54 wt. percent N). Ammonia has high volatility and is subject to strict regulation of discharges to the atmosphere. Urea is a solid that adsorbs moisture quite readily and makes the sludge more difficult to dry. Urea is also highly susceptible to breakdown to ammonia by the microbes and enzymes in biosolids if they are not properly prepared, resulting in nitrogen loss and an odor problem. Ammonium nitrate is a strong oxidizer and can result in a potential explosion problem which has all but eliminated this fertilizer from the commercial market after 2000. All of these fertilizers have high nitrogen content, but are less than ideal for combining with biosolids absent special processing.

Other references, such as European Patent No. 0143392, Japanese Patent No. 9110570 A2, and "Granulation of Compost From Sewage Sludge. V. Reduction of Ammonia Emission From Drying Process", Hokkaidoritsu Kogyo Shikenjo Hokoku, 287, 85-89 (1988) fail to disclose the use of acids with ammonium sulfate additions and do not discuss the issue of corrosion of steel process equipment under acid conditions.

Over the past thirty years alkaline stabilization of biosolids has been a standard and successful method of making biosolids into beneficially useful materials that can be used principally as soil-conditioning materials. Because these alkaline stabilized biosolids products have high calcium carbonate equivalencies, they have been produced and marketed as Agricultural liming or Ag-lime materials, usually as a replacement for calcium carbonate in farm soil management strategies. Because of this usage, the value of these materials has been restricted to only a few dollars per ton of product. However, transportation costs are high in large part due to the significant water content of the material. Amounts of water up to fifty percent render transportation economically and geographically restricted to areas close to the source of their treatment.

Thus, there is a long standing need for practical means of increasing the economic value of sewage biosolids through increasing its nitrogen content, and increasing the ability to be spread as well as a need to treat these materials such that they are converted into commodity fertilizers with physical and chemical and nutrient properties such that they can command significant value in the national and international commodity fertilizer marketplace. A series of U.S. patents, U.S. Pat. Nos. 5,984,992; 6,159,263; 6,758,879 and 7,128,880 describe methods of production of high nitrogen organically enhanced ammonium sulfate fertilizers made with biosolids utilizing a pipe-cross reactor as originated by the Tennessee Valley Authority. The pipe, tee and pipe-cross reactor are defined by the IFDC in the Fertilizer Manual (1998), p 440 as: "the pipe reactor consists basically of a length of corrosion-resistant pipe (about 5-15 m long) to which phosphoric acid, ammonia and often water are simultaneously added to one end through a piping configuration resembling a tee, thus the name 'tee reactor.'" The tee reactor was modified by TVA to also accept an additional flow of sulfuric acid through another pipe inlet located opposite the phosphoric acid inlet, giving the unit a "cross" configuration and thus the name "pipe-cross reactor".

Both the IFDC *Fertilizer Manual* (1998) and the Fertilizer Technical Data Book (2000) refer to the pipe-cross reactors. Pipe-cross reactors deliver a concentrated mix to the granulator shaping device and more efficiently evaporate undesired water from the fertilizer mix than other devices, but these references demonstrate a long-felt need for improvement, indicating that one of the shortcomings of the pipe-cross reactor is scale formation inside the pipe which can result in clogging.

The methodologies taught by this group of patents (U.S. Pat. Nos. 5,984,992; 6,159,263; 6,758,879 and 7,128,880) are plagued by problems related to the pluggage of these narrow (relative to their length) "pipe-cross" reactor configurations, the very short duration of reaction time in such "pipe-cross" reactors and the difficulty of control of the reaction temperature and pressure and retention time of the mix within such pipe-cross reactors. These pipe-cross reactors are narrow in contrast to their length, e.g., up to six to eight inches in diameter and often fifteen feet in length or longer. The plant practicing the manufacture of organically-enhanced ammonium sulfate fertilizers often had to shut down and disassemble the pipe-cross reactor either due to blockage from biosolids buildup or from destructive over heating in such reactors such that the commonly used Teflon® coating on the interior-reaction side of the reactor was melted and ruined. Further, the use of the pipe-cross reactor has the distinct disadvantage of having very short reactor retention times (usually less than twenty seconds) which is an advantage in the manufacture of traditional fertilizers like ammonium sulfate but is a disadvantage when coupled to the simultaneous processing of biosolids. Such short processing time increases the probability of untreated or non-homogenous mixing as the three material inputs pass through this reactor. Also limiting is the lack of control over the atmospheric pressure within such pipe-cross reactors since these reactors have open-ended discharges usually directly into a granulator. Related to but distinct from the lack of control of internal pressures, pipe-cross reactors also have little to no temperature control over the mix passing through the reactor.

U.S. Pat. No. 4,743,287 to Robinson describes a method to use two reaction vessels in sequence to incorporate organic biosolids into nitrogen fertilizers of low or medium nitrogen concentration (a range of four weight-percent nitrogen to a maximum of nitrogen concentration of ten weight-percent). Robinson uses his first reaction vessel to achieve very low pH values of the mixture (pH 0.2 to 1.5) to achieve hydrolysis of molecules present and to prepare the mix for reaction in a second reaction vessel. Robinson does indicate that a single reactor can be used, but only in a batch configuration and not in a continuous flow manufacturing method. Robinson also indicates that the acid and ammonia may not be injected in any order, but must be injected in sequence. This patent describes the reaction vessels capable of achieving high pressures (30 psig) with relatively long retention times as compared to the pipe-cross reactors. However, Robinson fails to meet the need for a novel and practical continuous flow method of manufacturing high nitrogen (greater than 8 wt. percent nitrogen) and biosolids-containing fertilizer products under the advantages of defined temperatures, pressures and reaction retention times. Thus, an urgent need exists for an effective, efficient, and economical process for treating biosolids.

SUMMARY OF THE INVENTION

The present invention overcomes the problems and disadvantages associated with current strategies and designs, and provides new tools and methods for the manufacture of fertilizers.

One embodiment of the invention is directed to methods for manufacture of a fertilizer comprising: providing an organic material that preferably contains biosolids, wherein the organic material has a solids content of at least ten percent; optionally adding an odor control agent to the organic material to create a mixture; adding an acid to the mixture under a first pressure and elevated temperature for a first period of time forming a liquefied mixture; adding ammonia to the liquefied mixture under a second pressure and elevated temperature for a second period of time; and processing the liquefied mixture to form the fertilizer. The phrase organic material includes all biosolids, but is not limited to biosolids such as organic biosolids, biosolids containing microorganisms, municipal biosolids or heat-dried biosolids, and also includes pharmaceutical and laboratory processing and fermentation wastes, farm and agricultural wastes, decayed and digested organic materials, harvested plants including farmed crop materials such as roughage and silage of corn and soybean plants as well as wheat, rice and barley plants, algae and cyanobacteria that may be harvested from ponds and other bodies of water, bacteria, mold and fungi, industrial wastes and their by-products, microbial, chemical and enzymatic digests of organic products, plant and animal foods, food stuffs, and byproducts, recycled fertilizers, and all combinations thereof. An element of the invention is that the organic material that contains plastic and hair and similar material does not need to be removed prior to processing. Preferably, the organic material is dewatered or hydrated to a solids content of between 15 and 40 percent, more preferably the organic material has a percent dryness of 22 percent or less. Also, a portion of the organic material may be dewatered to a dryness greater than 70 or 85 percent, and blended with the remaining portion of the organic material to achieve a desired percent dryness. Preferably, the organic material is hydrated with process water recovered from one or more steps of the method.

Optionally, odor control agents may be added to the organic material. Preferred odor control agents include, but are not limited to one or more of calcium ferrate, sodium ferrate, potassium ferrate, ferrous sulfate heptahydrate, rozenite, melanterite, ferric chloride, ferrous sulfate, ferrous sulfate monohydrate, hydrogen peroxide, ozone and salts, derivatives and combinations thereof, as well as various salts thereof. Preferably, the mixture of the organic material with the odor control agent forms a thixotropic mixture and the mixture is heated prior to the addition of acid. Also preferably, heating is performed in a first pressure vessel and the first pressure is maintained at between 20 and 60 psig, the first temperature is between 66 C (150 F) and 127 C (260 F), and the first period of time is between 3 minutes and 30 minutes. More preferably, the first temperature may be between 93 C (200 F) and 121 C (250 F) and the first period of time may be between 5 minutes and 10 minutes. Preferably the viscosity of the acidified and heated mixture is about 4,000 cP or less. The acid added to the mixture is preferably a phosphoric acid, a sulfuric acid, or a combination thereof. After acidification, the liquefied mixture is transferred to a second pressure vessel and, preferably, ammonia is heated under pressure to form a gas prior to being added to the liquefied mixture. The preferred second temperature is between 121 C (250 F) and 199 C (390 F), the preferred second period of time is between 1 minute and 30 minutes, and the preferred pressure within the second pressure vessel is maintained at between 50 and 200 psig. The viscosity of the ammoniated mixture is preferably about 1,000 cP or less. Processing of liquefied mixture comprises forming the usable fertilizer. Preferably, the processing comprises drying the combination to a solids content of greater than 92 percent, or more preferably to a solids content is at least 98 percent. One or more hardening agents may be added during processing such as, for example, ligno-sulfonate, molasses, alum or a combination thereof. Preferably processing is performed in a granulator to form granules and the granules are sized and granules of between 0.5 and 4 mm selected. Preferably, granules of greater than 4 mm are further crushed, and combined with granules of less than 0.5 mm and both are added during processing. An element of the invention is that each step of the method can be performed in a continuous process without interruption, although batch processing is also possible. The processes of the invention preferably also comprise a dust control system that collects and recycles dust material created from the processing.

Another embodiment of the invention is directed to fertilizer manufactured by the methods of the invention. Fertilizer will typically contains hydrolyzed polymers of one or more of plastics, pharmaceutical compounds, antibiotics, hormones, hormone-like molecules, biologically active compounds, macromolecules, carbohydrates, nucleic acids, fats, lipids, proteins, and microorganisms that are present in the biosolids. Preferably the hydrolyzed polymers are amino acids, most of which are not destroyed during the method of processing, that supplement and substantially increase the value of the fertilizer. Preferably, fertilizer of the invention has a nitrogen content of between 6 and 20 percent, a phosphate content of between 0 and 10 percent, a potassium content of between 0 and 5 percent, a sulfur content of between 10 and 30 percent, an iron content of between 0 and 10 percent, and an organic content of between 5 and 30 percent. Also preferably, the fertilizer has no or almost no unpleasant or disagreeable odors.

Another embodiment of the invention is directed to processes for manufacture of a fertilizer with a predetermined content of one or more of nitrogen, phosphate and potassium comprising: providing an organic material containing biosolids wherein the organic material has a solids content of at least ten percent; optionally adding an odor control agent to the organic material to create a mixture; heating the mixture under a first pressure to a first temperature for a first period of time; adding an amount of a predetermined acid to the heated mixture, thereby creating an exothermic reaction and forming a liquefied mixture; adding a predetermined amount of ammonia to the liquefied mixture under a second pressure and heating the mixture to a second temperature for second period of time, wherein the amount of ammonia added is determined from the composition of the organic material; and processing the liquefied mixture to form the fertilizer with a predetermined content of one or more of nitrogen, phosphate and potassium. The process of the invention may optionally further comprise adding one or more plant nutrients to during processing. Such plant nutrients that can be added include, but are not limited to one or more of urea, ammonium nitrate, ammonium sulfate, monoammonium phosphate, diammonium phosphate, urea ammonium nitrate, liquid urea, potash, iron oxide, soluble iron, chelated iron and combinations thereof. The process preferably further comprises adding and one or more hardening agents during processing such as, for example, ferric oxides, alum attapulgite clay, industrial molasses, lignin, ligno sulfonate, urea formaldehyde polymerizer and combinations thereof.

Another embodiment of the invention is directed to systems for the manufacture of a fertilizer comprising: a mixer that blends biosolids with an odor control agent; a first reaction or pressure vessel wherein the blended biosolids are mixed with an acid and heated to a first predetermined temperature and pressurized to a first predetermined pressure for a period of time forming a liquid; a second reaction or pressure vessel wherein the liquid is mixed with ammonia from an ammonia source and heated to a second predetermined temperature and pressurized to a second predetermined pressure for a second period of time; and a granulator wherein the ammoniated liquid is mixed with preformed granules and heated to form dried granules of the fertilizer. Preferably the ammonia source is liquefied or gaseous ammonia under pressure and the first and second reaction or pressure vessels each contain an agitator. The systems may also include a screening process to select product sized fertilizer granules, and one or more a cooling and coating apparatus to reduce temperature and control dust prior to storage. Optionally, the cooler may include an ozone generator that provides ozone to the cooling fertilizer to eliminate or at least substantially reduce disagreeable odors. Preferably, systems also comprise a conveyer for transporting biosolids to the mixer and another conveyer for transporting the blended biosolids to the first reaction or pressure vessel; a pressurized piping system that transports acidified biosolids from the first reaction or pressure vessel to the second reaction or pressure vessel, ammonia into the second reaction or pressure vessel; and disperses the ammoniated liquid to the granulator. Preferred systems further comprise one or more screens for selecting granules of a predetermined size and a rotary cooler for cooling and polishing the sized granules, and both a dust control apparatus that collects and recycles dust from the granulator and a water recovery system whereby water extracted from biosolids during processing is recovered and recycled. In certain embodiments, the first and/or second reaction or pressure vessel may be a pipe-cross reactor, or both reaction or pressure vessels are pipe-cross reactors. The process may be performed as a continuous or batch process.

Another embodiment of the invention is directed to methods for manufacture of a product comprising: providing an organic material wherein the organic material has a solids content of at least ten percent; adding an acid to the organic material under a first pressure and elevated temperature for a first period of time forming a liquefied mixture; adding ammonia to the liquefied mixture under a second pressure and elevated temperature for a second period of time; and processing the liquefied mixture to form the fertilizer. Preferably the organic material is plant or bacterial material and, also preferably, the plant or bacterial material is algae, bacteria, fungi or a combination thereof. Preferably there are toxic materials present in the organic materials that are hydrolyzed or otherwise rendered nontoxic or inactivated by the process of the invention. Preferably the first pressure is between 20 and 60 psig, the elevated temperature is between 66 C (150 F) and 127 C (260 F) and the first period of time is between 3 minutes and 30 minutes. Also preferably, the second pressure and elevated temperature for a second period of time are, respectively, between 50 and 200 psig and between 121 C (250 F) and 199 C (390 F), between 1 minute and 30 minutes. Preferably the product is a fertilizer.

Another embodiment of the invention is directed to fertilizer manufactured by the methods of the invention. Preferably, fertilizers of the invention have both fast and slow nitrogen release profiles so that a percentage of available nitrogen is released to the soil upon application of the fertilizer, preferably from 10% to 70%, and a second, slower release representing about 30% to 90% of the available nitrogen content of the fertilizer releases into the soil over a period of week and months. Preferably, nitrogen release is timed to match the needs of the growing crops or plants.

Other embodiments and advantages of the invention are set forth in part in the description, which follows, and in part, may be obvious from this description, or may be learned from the practice of the invention.

DESCRIPTION OF THE FIGURES

FIG. 4. Physical and chemical characteristics of organically modified ammonium sulfate fertilizer of one embodiment of the invention.

DESCRIPTION OF THE INVENTION

All countries and population regions around the world create waste in the form of organic materials. The phrase organic material includes, but is not limited to biosolids such as organic biosolids, biosolids containing microorganisms, municipal biosolids and heat-dried biosolids, and also includes pharmaceutical and laboratory processing and fermentation wastes, farm and agricultural wastes, decayed and digested organic materials, harvested plant and plant-like materials such as algae including blue/green algae, bacteria including blue/green bacteria, cyanobacteria (e.g., blue/green, rust, black), mold and fungi, industrial wastes and their by-products, microbial, chemical and enzymatic digests of organic products, plant and animal foods, food stuffs, and byproducts, animal manures, digested and processed animal manures, recycled fertilizers, and all combinations thereof. Disposal of organic waste materials pose a major problem as well as expense to all communities. Traditional disposal methods involve burial, burial at sea or incineration. Each of these options compounds the problem by creating untenable amounts of pollution that foul the community as well as the planet. New techniques have been developed that involve heat treatment to inactivate microorganisms and other potentially contaminants that can result in a product that can be as a low value fertilizer. Although these techniques are ecologically sound, they have not caught on because, in large part, the product is of such low value that there is little to no commercial incentive for communities to switch from the traditional bury and burn philosophy, and no funds that allow for the creation of safe processing facilities.

It has been surprisingly discovered that high-value fertilizer can be efficiently manufactured from organic materials, including but not limited to raw and semi-processed biosolids, agricultural materials and industrial wastes. The process of the invention destroys not only all potentially harmful microorganisms, but hydrolyzes many polymers including forms of biopolymers (e.g., DNA, proteins, carbohydrates, toxins, antibiotics, hormones, etc.), forms of composite materials, and even forms of plastics. The resulting fertilizer product is of high value and also contains the hydrolyzed monomers (e.g. amino acids, sugars, etc.) that are beneficial and desirable for a fertilizer. The process of the invention also allows for the production of fertilizer with pre-selected amounts of each of the components of the fertilizer including, but not limited to, the concentrations of nitrogen, phosphorous, potassium, sulfur, iron and organics.

Figure 3:
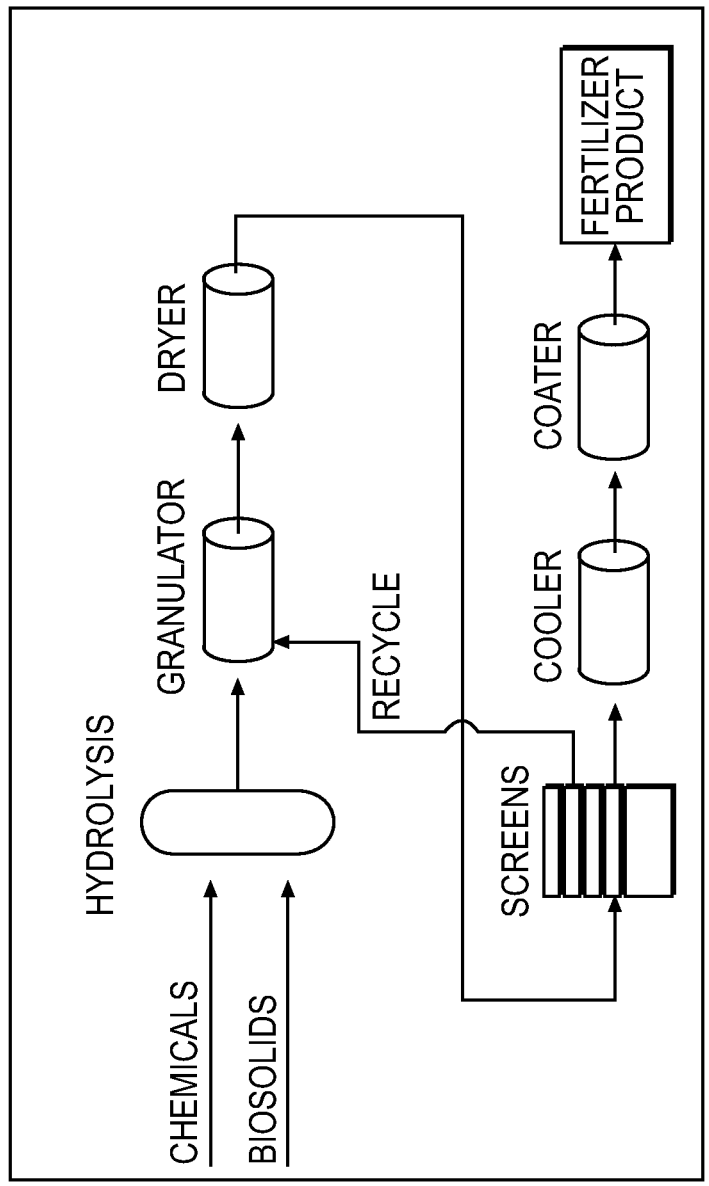
FIG. 3. Schematic of a modified Ammonium Sulfate Process.

One embodiment of the invention is directed to methods for the manufacture of a fertilizer. A schematic of the general process of the invention is depicted by FIG. 3. The method comprises providing an organic material which may contain biosolids or another organic material to which, optionally, is added an odor control agent, that itself can be utilized as an important plant nutrient in the final fertilizer product, to reduce or eliminate odors that may be present from the organic material or other components of the starting materials. The resulting mixture, which may contain added water recycled from other steps of the method, is thoroughly mixed and heated to a predetermined temperature for a period of time prior to commencing the critical acid/base reactions that occur in a reaction or hydrolysis vessel. To this heated material is added an acid that reacts exothermically with the organic material and increases both temperature and pressure. During this time, preferably two to ten minutes, the components are mostly or entirely liquefied. To the heated liquefied material, which optionally may be transferred to a second pressure vessel, is added ammonia, which is preferably also liquefied or vaporized and also under pressure, and the subsequent reaction with the acid component of the mixture serves to further increase temperature and pressure. The ammoniated and liquefied biosolids are maintained for a short period of time under these conditions, preferably two to ten minutes, and then processed, preferably into granules of fertilizer.

The ammoniation reaction may be carried out to completion whereby all or nearly all of the acid is reacted such that little to no residual acid remains. The combination of nearly all of the acid produces a salt or a salt melt (a partially ammoniated mix) (e.g. with sulfuric acid the salt produced is ammonium sulfate). Preferably, upon ammoniation salt to melt ratios are about 20/80, about 25/75, about 30/70, about 35/65, about 40/60, about 45/55, about 50/50, about 55/45, about 60/40, about 65/35, about 70/30, about 75/25, and about 80/20. Salt formation may be determined and in real time by the measurement of the pH of the mixture. Preferred pH values are between 6.2 and pH 7.0. Alternatively, it is sometimes preferable to partially ammoniate the acid mixture in the reactor and complete the ammoniation in a second pugmill or in the granulation process.

An advantage of this invention is that, because the organic materials are liquefied, the liquid can be more easily transported as needed through pipes preferably using pressure differentials as compared with any solid, semisolid or thixotropic material. The liquefied organic materials can also be more evenly applied to acceptor material in the granulator thereby permitting the formation of a more evenly formed spherically-shaped granule. Biosolids are preferably entirely liquefied, although mostly liquefied is typically sufficient. Preferably the liquid exhibits a characteristic readiness to flow, little or no tendency to disperse, and relatively high incompressibility.

Viscosity of the starting organic material is typically in excess of 100,000 cP and typically 150,000 cP at ambient temperature and does not change significantly even at elevated temperatures typical in a processing facility. For comparative purposes, at about room temperatures, molasses has a viscosity of about 5,000 to 10,000 cP, honey has a viscosity of about 2,000 to 10,000 cP, chocolate syrup has a viscosity of about 900 to 1,150 cP, and olive oil has a viscosity of about 81 cP. With the addition of acid and heat according to invention, viscosity of the organic material decreases to a range of from about 1,000 to 10,000 cP, and preferably to less than 4,000 cP, more preferably to less that 3,000 cP, more preferably to less than 2,000 cP, and more preferably to less than 1,000 cP. With the addition of ammonia and the added temperature increase from the resulting exothermic reaction, viscosity decreases to a range of 500 to 4,000 cP, and preferably to 2,000 cP or less, more preferably to 1,000 cP or less, and more preferably to 750 cP or less, and more preferably to 500 cP or less. Also, problems typically associate with solid debris that is normally present in organic material such as biosolids, with debris such as plastic and hair, are eliminated as all such material is hydrolyzed as well.

The low viscosity material of the invention has a substantially decreased energy requirement for transportation and processing as compared with conventional materials. No biological or organic solid material remains, so problems and inefficiencies commonly associated with solid debris clogging or otherwise blocking transport from one area to another and thereby requiring shutting down the system for maintenance are eliminated. No solids or semi-solids are present that would otherwise increase wear and tear on equipment and thus, shorten equipment life. Further, organic solid materials including, for example, plastic and hair, well known to cause blockages in conventional processing, are completely broken down and hydrolyzed to their monomer components. The acid reaction hydrolyzes many polymers that may be present including plastics, hair, and biologically active compounds (whether naturally present or artificially created), and breaks down and destroys many and nearly all and preferably all macromolecules and microorganisms that may be present. This increases the safety to process workers and further simplifies and increases the efficiency of any cleaning or maintenance of the system that may be required periodically. This hydrolysis further increases the safety in the use of the resultant fertilizer product in comparison to other traditional organics-containing fertilizer products such as those made in biosolids alkaline-stabilization processes.

Another advantage of the invention is that, because the process can be easily contained, the need for dust and odor control apparatus is minimized. The processing steps are closed and under negative pressure and no steps are performed in open or areas exposed to the environment or the environment of the facility. Odor control agents are preferably added initially, but could optionally as easily be added at any step in the process. Alternatively or in addition to other odor control processing, the granules may be exposed to ozone during formation and/or cooling. Ozone will substantially reduce or eliminate disagreeable odors of the fertilizer. Thus the invention is a major improvement as compared to conventional fertilizer manufacturing practices in which a large manufacturing facility is located as far away from communities as possible thereby requiring that input materials be shipped over long distances to operate the plant. A good example of this problem was the biosolids conversion-to-fertilizer plant located in Helena, Ark. which practiced the manufacturing processes taught in U.S. Pat. Nos. 5,984,992; 6,159,263; 6,758,879; and 7,128,880, and utilized biosolids that were transported all the way from New York City.

Another advantage of the invention is that, because acid and ammonia are added in a controlled manner, the final components of the fertilizer can be predetermined. The exact amount of nitrogen in the final product can be regulated based on the amount of the starting materials including the biosolids, acid, base, water, and any other components. Similarly, the exact amount of sulfur, iron, phosphate, potassium and even organic matter can also be regulated or, if desired, eliminated from the final product producing a custom-made fertilizer product. Many crops that require fertilization are grown in areas known to be high in phosphate, sulfur, potassium or other elements. Fertilizing with conventional fertilizers, although needed, typically exacerbates the contamination. Fertilizers produced by the methods of the present invention would not only overcome such problems, but could be tailored for use in conjunction with a specific type of soil or specific need of a select type of crop. In addition, the process of the invention allows for supplementation of the fertilizer during processing with additional ingredients.

Another advantage of the invention is that it is easily performed in large scale, with continuous processing and under automation. No significant retention times are required, thus no delays, so that processing continues from start to finish without interruption as can be required when material is required to incubate for days as is common for some types of conventional biosolids processing as in composting or alkaline stabilization processes. Also, the process is not dependent on a particular amount of material. The process of the invention is scalable to any amount of organic material. This is highly preferred at least because most municipal regions vary in size and thus, the amounts of organics such as biosolids produced per day vary widely. Also, amounts are expected to also vary over time. Further, each step of the process can be performed under complete automation including accounting for necessary variation per day and over time.

Another advantage of the invention is that it allows for co-location of the facilities for processing organic materials such as biosolids with the treatment plants. Biosolids can be then taken directly from waste water treatment plants to processing thereby minimizing transport and potential spillage of potentially harmful compounds. Another preferred embodiment is to locate close enough to the wastewater treatment plant to be connected by a screw or belt conveyor or a biosolids pumping system. Alternatively, another preferred embodiment is to locate adjacent to the wastewater plant. The goal of the present invention is to place the processing plant as close to the wastewater plant as possible. Thus the present invention eliminates the cost of transportation by locating the physical equipment necessary to perform the manufacturing process adjacent or close to the source of the biosolids such as municipal wastewater treatment plants. Manufacturing plants of the invention preferably allow for adjacent storage facilities. Again, by being adjacent, transportation logistics are simplified or eliminated thereby reducing transportation costs of the product as well as the transportation costs of input organics such as biosolids. Also, the processes of the invention have the advantage that they may be interfaced with other production facilities. Those facilities may be associated with an unrelated commercial enterprise such as, for example, nylon or steel production. In these two industries hot ammonium sulfate is created as a by-product to the manufacture of product. Further and more commonly, co-locating near a commercial enterprise that creates excess heat, as in a furnace, or kiln, would advantageously permit the use of this excess heat by the present invention as in the replacement of the need for fossil fuels such as natural gas or by the cogeneration of electricity by utilization of said excess heat. By co-locating a processing facility of the invention at these types of sites, the otherwise unwanted by-products such as ammonium sulfate need not be carted away, but can be directly utilized in the manufacture of fertilizer according to the present invention.

Another advantage of the invention is that because the process minimizes the amount of water and power (e.g. electrical) needed, and amount of waste byproducts formed, as compared to conventional processing, manufacturing can be sized to service the needs of the size of the particular community in which the plant is located. This tailoring design allows for a biosolids processing/fertilizer manufacturing plant that can process smaller amounts of biosolids (e.g., less than 3 tons per hour of dewatered biosolids) or scaled up for larger plants (e.g., up to 10 to 12 tons per hour or more). In a preferred embodiment the optimal size is between 6 and 8 tons per hour when the biosolids are standardized to a percent solids of 25. The amount of biosolids processed per hour does depend upon the percent solids of the biosolids. As the biosolids increase in moisture the amount of biosolids that may be processed per hour increases proportionally. This sizing feature reduces costs, allows for standardization with interchangeable equipment and increases the efficiency of the operational logistics as well as decreases overall liability.

Organic materials that can be processed according to the invention include, but are not limited to biosolids. Types of biosolids include municipal biosolids, domestic septage, farm and agricultural wastes, animal manures, digested and processed animal manures, recycled biosolid fertilizers, organic biosolids, biosolids containing microorganisms, and heat-dried biosolids. Other organic materials that can be processed according to the method of the invention include, but are not limited to pharmaceutical and laboratory processing and fermentation wastes, organic industrial wastes, microbial materials, decayed and digested organic materials, farm and agricultural wastes, harvested plant materials such as algae including blue/green algae, seaweed and other aquatic plants and water-borne organic detritus, bacteria including blue/green bacteria and cyanobacteria (e.g., blue/green, rust, black), slime, insects and insect biomass (e.g., body parts, manure), mold and fungi, industrial wastes and their by-products, microbial, chemical and enzymatic digests of organic products, foods, food stuffs and food byproducts, and combinations thereof. In addition to conventional biosolids, most all organic materials can be processed by the methods of the invention including spoiled or otherwise rotted food stuffs such as, but not limited to meats, fish and agricultural products as well as plastics, and carbon-containing household trash and recyclables.

Another advantage of the invention is that organic materials, and even certain non-organic materials, that are otherwise difficult to dispose can be processed according to the invention as a method of turning into a useful product what would otherwise be waste material occupying space in a landfill or the ocean. By way of non-limiting example, algae is skimmed from the surface or otherwise collected from bodies of water for aesthetic purposes as well as for the general health of the plants and animals that habitat the environment. Often this algae may be contaminated with natural toxins or toxic compounds absorbed or metabolized and concentrated within the algae from the environment. By processing the algae according to the methods of the invention, the algae can be converted to fertilizer and, importantly, the toxins destroyed or otherwise inactivated. In addition, algae or other plants or bacteria may be intentionally grown in or on a contaminated area and harvested to be processed according to the invention. In addition, as toxic contamination is a matter of concentration, the materials generated from the processes of the invention can be added to other processed materials and sufficiently diluted so as not to pose a hazard. This process of land or water reclamation can be performed with a variety of plants, bacteria and insects with the organisms collected, processed according to the invention and rendered non-toxic or otherwise harmless. Accordingly, the process of the invention can be applied to treated or untreated soil, humus and most any biomass including cellular components, sedimentary organic matter, and biotic materials.

The organic material is preferably dewatered or hydrated to a solids content of between 10 and 40 percent, more preferably between 20 and 30 percent, and more preferably between 22 and 25 percent. The optimal solids content of a particular organic material can also be empirically or experimentally determined. Organic material received for processing according to the invention will typically have lower solids content than the optimal level. Preferably, the organic material of insufficient solids content can be adjusted to the desired concentration through blending/mixing with 'dry' organic materials with a solids concentration of 70 to 95 percent and preferably 85 to 92 percent. The 'dry' organic materials may be available through third party sources or may be produced with the available organic material through heat drying. Heat drying processes include heated screw conveyors, disc dryers, rotary dryers, paddle mixer/dryers, fluid bed dryers and other commercially available processes/equipment. The dried organic materials and the organic material of insufficient solids concentration will be mixed in a mixing vessel to reach the ideal solids content as determined empirically or experimentally. The mixing vessel may be a pugmill, a mixing screw conveyor, a multishaft mixer, a ribbon paddle blender, a high shear mixer or other commercial high viscosity slurry mixer. Less preferably, the organic material of insufficient solids content can be adjusted to the desired concentration by heating the material to remove water as necessary to attain the desired concentration. This can also be done in the same heat drying equipment listed above. Organic materials received for processing may need hydration and, when necessary, additional water is preferably added from water collected during other steps of processing. This use of recycled water further adds to both the efficiency and beneficial economics of the invention.

If necessary during the intake processing, the organic material can be conditioned by injection of steam, water, and/or heat (e.g. made thixotropic) to enable or enhance flow or movement. In these initial steps, the organic material can be blended with chemical additives such as oxidizing agents, for the initial odor control and to prepare the biosolids for reaction in the pressure vessel. For example, biosolids may be infused with black or agricultural grad phosphoric acid to minimize odors. In this example, the phosphoric acid added here will alter the final concentration of phosphate in the fertilizer product. The amount of phosphate added to the product in this step can be as little as 0.5 percent and as much as 6 percent. In addition to odor minimization, the phosphoric acid adds a valuable nutrient component to the product fertilizer.

Preferably the odor control agent is added to the initial organic material to be processed, although one or more odor control agents can be added at any time during processing including during granule formation and cooling. Preferred odor control agents include, but are not limited to calcium ferrate, sodium ferrate, potassium ferrate, ferrous sulfate heptahydrate, rozenite, melanterite, ferric chloride, ferrous sulfate, ferrous sulfate monohydrate, hydrogen peroxide, and/or ozone as well as various other salts, derivatives and combinations thereof. The amount and type of odor control agent can be determined empirically by one of ordinary skill in the art, but typical amounts range from 0.01 percent by weight of the mix or of the granules, to up to 6 percent of the mix or granules, and is preferably about 0.05%, 0.1%, 0.25%, 0.5%, 0.75%, 1.0%, 1.5%, or 2.0%.

The organic material, odor control agent and possibly recycle water are delivered to a mixing vessel where they are thoroughly mixed and may form a thixotropic paste that is pumped or easily transported. The mixing vessel may be a pug mill, a mixing screw conveyor, a multishaft mixer, a ribbon paddle blender, a high shear mixer or other commercial high viscosity slurry mixer. Pug-mills, blenders and mixers are mixing chambers having blade-shaped blending elements mounted on a powerfully driven shaft or shafts that rotate at a variable but controlled speed which divide, mix, back-mix and re-divide the materials to be blended multiple times a second to yield a thorough, uniform blend with reliable consistency.

Alternatively, the mixing vessel to reach solids concentration and the mixing vessel for the conditioning with recycle water, phosphoric acid, odor control agents or other additives may be combined in a single mixer of adequate size to give desired mixing energy and time.

This mixture is heated preferably by indirect heat such as a heated screw conveyor, paddle mixer or disc dryer or direct heat such as steam injection, to a temperature required for proper reaction in the next acidification phase of the process. The required temperature is determined by the type and concentration of the acid used as well as the type and concentration of the organic materials mixture. Heating the mixture preferably involves continuous mixing or agitation of the mixture within the mixing vessel and possibly heating of the vessel itself. Accordingly, to achieve a desired temperature of the mix, more or less heat may be required depending in part of the material composition of the vessel. Preferably heating is performed for a retention period of time that is equivalent to the time required to achieve the desired temperature or the mixture may be maintained for longer periods of time. Preferred periods of time, which includes heating time, are between 1 and 30 minutes, more preferably between 3 and 15 minutes, more preferably between 5 and 10 minutes (or any combination of these ranges). Also, heating times may also be dependent on the amount of mixture being heated. Preferred is a heating time that is about equivalent to the time it takes to achieve the desired temperature. Less preferably, heating may also be achieved through direct injection of steam or heated gases in a mixing vessel or piping system.

To the heated mixture is added acid, in the preferred embodiment at the inlet of the first pressure vessel, creating an exothermic reaction, which thereby causes additional heating. The acid is added to the mixture by direct injection into a pressure vessel or injection at the vessel inlet. In the pressure vessel the mixture is agitated or otherwise continuously mixed. The acid is at a very low pH and preferably in the range of pH negative 4.0 to pH positive 2.0. As is known to those skilled in the art, with a very strong aqueous acids there are too few water molecules to disassociate the acid completely. As a consequence, the true pH is much lower than an actual measurement. A negative pH indicates that the pH calculation would be a negative log of the molarity where the molarity of hydrogen ions is greater than 1. Preferred pH values for acids utilized are, for example, pH of 2.0 or less, pH of 1.0 or less, pH of 0.8 or less, pH of negative 1.0 or less, pH of negative 2.0 or less. Preferred acids include, but are not limited to hydrochloric acid, boric acid, hypochlorous acid, perchloric acid, carbonic acid, phosphoric acid, sulfuric acid, nitric acid, hydrofluoric acid, carboxylic acid, and derivatives, mixtures, and combinations thereof. The amount and type of acid added is determined by one of ordinary skill in the art from the amount of organic materials being treated and/or the desired result, which includes but is not limited to one or more of, achieving a predetermined temperature or pressure or liquefying the mixture. In part because the organic materials are liquefied, there is little to no build up of calcium silicate, insoluble phosphate compounds or other insoluble compounds in pipes, a typical problem with conventional biosolids processing facilities. Addition of the acid causes an exothermic reaction that heats and increases the pressure of the container. This pressure which upon commencement of the reaction is at ambient may in fact be maintained at ambient or a desired pressure throughout the acidification process by monitored or controlled venting. Alternatively the pressure may be allowed to increase with increasing temperature due to the exothermic heat of dilution reaction. Such pressures may reach an upper range of 60 psig by controlling venting or in the absence of venting.

Temperature of the mixture increases, preferably to or above 66 C (150 F) such as for example to or above 82 C (180 F) or 93 C (200 F), and more preferably to or above 104 C (220 F), 110 C (230 F), 116 C (240 F), 121 C (250 F), 127 C (260 F), 132 C (270 F), 137 C (280 F), 143 C (290 F), 149 C (300 F), 163 C (325 F) or to or above 177 C (350 F). This acidification may be carried out without pressure in the reactor by permitting release of vessel air during acidification, however in the preferred embodiment to facilitate the transfer of the acidified mix into the second vessel the pressure in the first or acidification vessel will be maintained above the pressure achieved the second vessel. The acidification process is carried out for a retention time of between 3 minutes and 30 minutes with a preferred time of between 4 minutes and 8 minutes.

Subsequent addition of the ammonia base, preferably in a second pressure vessel, further affects the temperature of the mix, preferably raising the temperature to at or above 132 C (270 F) such as 138 C (280 F) or 143 C (290 F), more preferably to at or above 149 C (300 F), more preferably to at or above 154 C (310 F), 160 C (320 F), 166 C (330 F) or 171 C (340 F), and more preferably to at or above 177 C (350 F) such as for example to at or above 182 C (360 F), 188 C (370 F), 191 C (375 F), 193 C (380 F), 199 C (390 F), 204 C (400 F) 210 C (410 F), 216 C (420 F), 221 (430 F), 227 C (440 F) or 232 C (450 F). Preferably heating is performed for a retention period of time that is equivalent to the time required to achieve the desired temperature and allow completion of reactions. Preferred periods of reaction time, which may include exothermic heating time, are between 1 and 30 minutes, more preferably between 3 and 15 minutes, more preferably between 5 and 10 minutes, or any combinations of these ranges. Also, reacting times may also be dependent on the constituents and/or makeup of mixture being reacted and/or the amount and/or type of acid added. Reactions take place in closed container vessels, and pressure in the headspace of the container vessel increases as well. Pressures can again be regulated with pressure relief valves and are preferably maintained between 5 psig and 250 psig, more preferably between 30 psig and 150 psig, and more preferably between 40 and 100 psig. Preferred pressures include, but are not limited to 5, 10, 20, 30, 40, 50, 60, 70, 75, 80, 90, 100, 110, 120, 125, 130, 140, 150, 160, 170, 175, 180, 190, 200, 210, 220, 225, 230, 240 and 250 psig.

After reaction of the acid at the desired time, temperature and pressure, the acidified mixture is discharged from the acid pressure vessel and transferred to a second pressure vessel. At the second pressure vessel, ammonia is injected to the mixture either at the second pressure vessel inlet or directly into the second pressure vessel. The amount and form of ammonia added is determined by one of ordinary skill in the art from the amount of acidified mixture or organic materials being treated and the desired result, which includes but is not limited to one or more of, achieving a predetermined temperature or pressure or liquefying the mixture. The addition of ammonia increases the temperature of the mixture liberating steam which increases the headspace pressure within the second pressure vessel. Pressures can again be regulated with pressure relief valves and are preferably maintained between 50 psig and 200 psig, more preferably between 75 and 150 psig, and more preferably between 100 psig and 130 psig (or any combinations of these ranges). Preferably the ammonia addition is performed for a retention period of time that is equivalent to the time required to inject the ammonia and complete the ammoniation reactions. Preferred periods of time are between 1 and 30 minutes, more preferably between 3 and 15 minutes, and more preferably between 5 and 10 minutes (or any combinations of these ranges). Also, time to inject ammonia and complete the ammoniation reactions may be dependent on the amount of acidified mixture present and/or the amount and/or form of ammonia added. The pH at this point is preferably from about 1.5 to about 7.5, and more preferably from about 6.0 to about 7.0.

The processes of the present invention with biosolids and others forms of organic materials produce a fertilizer that is preferably safe to handle and work with and preferably meets and/or exceeds the minimum requirements of a USEPA Class A biosolids. Fertilizer product is preferably sterilized and biological and chemical contaminants are at least partially and preferably completely hydrolyzed and biological agents or organisms are denatured to the point of inactivation and/or destruction. Typical biological or chemical contaminants include, but are not limited to one or more of pharmaceutical compounds, antibiotics, hormones, hormone-like molecules, biologically active compounds, macromolecules, carbohydrates, lipids, proteins, nucleic acids, and combinations thereof.

The present invention preferably includes a stress conditioning over a predetermined retention period that creates stress conditions that meet or exceed those associated with traditional autoclaving of materials. This autoclave effect destroys and/or inactivates or simply sterilizes the organic material. Microorganisms in the organic material, including for example, bacteria, viruses, fungi, parasites, parasite eggs, bacterial and fungal spores and combinations thereof, are destroyed and/or inactivated. In addition, the processes of the invention are preferably designed to hydrolyze macromolecules such as proteins, nucleic acids, lipids, fats, carbohydrates and combinations thereof, and/or other biologically-active substances that may be present.

At any time during the steps of the method, one or more hardening agents can be added to the mixture. Preferred hardening agents include, but are not limited to ferric oxides, alum attapulgite clay, industrial molasses, lignin, ligno sulfonate, urea formaldehyde polymerizer and combinations thereof.

At the desired time, which may be determined empirically or experimentally, the liquid is processed into fertilizer. Preferably processing involves transfer to a granulator for removal of water and formation of dried fertilizer granules. Preferred is processing in a granulator which contains 60-88 percent by weight old granules, and drying the granules preferably with heat to greater than 90 percent solids, and preferably 98 or 99 percent solids or greater. Preferably, water extracted from the granules is collected with a portion recycled in the steps of the process and the remainder treated for discharge. Granules are typically quite hot during the drying process and, optionally, may be allowed to cool by transfer to a cooling room or cooling apparatus. During cooling, ozone may be injected into the cooler as an odor control measure. Preferred amounts of ozone to be injected are from 0.01% to 5% of the weight of the cooling granules, more preferably from 0.1% to 2% and more preferably from about 0.5% to 1%. Preferably, ozone is introduced to the cooling apparatus by sparging.

Once dried and formed and optionally after cooling, the granules are sized and preferred are granule size of 0.5 mm to 4 mm. More preferred are standard fertilizer granules of about 2.8 mm and specialty "mini" granules of about 1 mm.

One or more commercially available hardening agents can be added to the granulator. Preferred hardening agents include, but are not limited to ligno-sulfonate, lignin, molasses, or a combination thereof. Granules of greater than 4 mm and less than 0.5 mm are recycled in the granulator. Granules of the desired size are further processed by coating with one or more commercially available dust control agents. Preferably, granules greater than 4 mm are crushed and mixed with the granules of less than 0.5 mm, and all is recycled in the granulator.

The invention preferably provides for both dust and odor control systems to ensure community acceptance of the manufacturing plant and to facilitate meeting USEPA standards as well as making the process more efficient through the capture and incorporation of valuable nitrogen or other potential and/or fugitive plant nutrients from the processed air of the plant.

Another embodiment of the invention is the fertilizer manufactured by the methods of the invention. The physical and chemical characteristics of organically modified ammonium sulfate fertilizer of one preferred embodiment of the invention are listed in FIG. 4. Fertilizer from organic materials such as biosolids may be powdered or in blocks, or is preferably in the form of granules that are of a predetermined size and are resistant to crushing after polishing as compared to unpolished granules. Further, preferred granules have a smooth exterior with few pits or crevices and circular or oval in shape. Preferably, the fertilizer contains no or negligible detectable un-hydrolyzed polymers and preferably the polymers within the organic mixture have been hydrolyzed including, but not limited to plastics, pharmaceutical compounds, antibiotics, hormones, hormone-like molecules, biologically active compounds, macromolecules, carbohydrates, nucleic acids, fats, lipids, proteins, and microorganisms. Hydrolyzed polymers form monomers of the polymer that accumulate in the product and are preferably amino acids.

The process of the invention preferably results in the production of granules or pellets of USEPA Class A fertilizer product of suitable dryness, hardness, and chemical quality to produce a valuable, high-nitrogen, controlled release (e.g. slow release or dual release) commercial fertilizer product that is capable of competing in the national and international marketplace against traditional inorganic fertilizers. A commercial, high-nitrogen fertilizer preferably has greater than 8 percent nitrogen by dry weight of the finished fertilizer and more preferably at least 16 percent nitrogen by dry weight of the finished fertilizer. The Class A characteristic refers to the microbiological quality of the finished fertilizer product, which meets the United States Environmental Protection Agency Class A microbiological standards for a product containing municipal biosolids as defined in 40 C.F.R. §503. Also, fertilizer of the present invention meets or exceeds this standard on the basis of the stress condition and the retention time utilized thus ensuring that the associated USEPA Vector Attraction Standards are met (90 percent solids or greater in the finished product), that the finished fertilizer granule is optimized for minimal water content increasing hardness characteristic and eliminating water with respect to transportation of the finished fertilizer. The percent solids of the finished product are preferably greater than 92 percent solids, more preferably greater than 97 percent solids, and more preferably greater than 99 percent solids.

Biosolids treated according to the processes of the invention typically contain low levels of metals such as arsenic, cadmium, copper, lead, mercury, molybdenum, nickel, selenium and/or zinc. Low levels are levels below what are considered harmful and less than the Exceptional Quality ("EQ") standard for metals as published by the USEPA for products containing municipal biosolids. Thus, by exceeding the USEPA regulation and the hydrolyzing conditions of the hydrolyzer or pressure vessel for macromolecules (e.g., personal pharmaceutical products such as antibiotics or hormones or hormone-like substances), the resulting fertilizer is safe for use in and around farming, plants, and animals and is exceptionally safe for handling by workers during processing, handling, distribution and sales.

As the fertilizer product produced contains both biosolids and a high-content of desirable nitrogen, a preferred embodiment results in a variety of specific nutrient formula fertilizers of which the following are typical: 16-0.5-0-18-3-15 or 16-0.5-2-17-3-14 (Nitrogen-Phosphorus-Potassium-Sulfur-Iron-Organics) slow release granular fertilizer that is at least 99 percent dry and exceeds the United States Environmental Protection Agency (USEPA) Class A requirements and Exceptional Quality (EQ) Standards. The 16 percent controlled-release organic nitrogen component helps bind the nitrogen in the root zone when and where it is needed. For example, the nitrogen in the ammonium ion, because it is bound to components of the biosolids, migrates slowly through the root zone and stays available to the plant rather than being volatized or lost to the ground water below the root zone. As a result it may be absorbed into the plant slowly over time.

The fertilizer product may be tailored to a desirable content of elemental components. Preferably the fertilizer has a nitrogen content of between 6 and 20 percent, more preferably from 8 to 18 percent, a phosphate content of between 0 and 10 percent, more preferably from none to 5 percent, a potassium content of between 0 and 5 percent, more preferably from one to four percent, a sulfur content of between 10 and 30 percent, more preferably from 15 to 20 percent, an iron content of between 0 and 10 percent, more preferably from one to four percent, and an organic content of between 5 and 30 percent, more preferably from 10 to 20 percent (or any combinations of these ranges).

The fertilizer product contains nitrogen in the form of ammonium ions non-covalently bound to organic and other chemical compounds of the fertilizer. Unlike ammonium sulfate fertilizer, the bound ammonium ions are not all immediately released into the soil upon application. Instead, there is an immediate release of a bolus of nitrogen to the soil that represents from about 30-60% of the available nitrogen of the fertilizer. This fast release is typically over a period of one to two weeks, slower than a conventional ammonium sulfate fertilizer that typically releases 90% or more of its available nitrogen to the soil in about 5 to 10 days, but slightly faster than or equal to nitrogen release of conventional pure biosolids fertilizers. Over the subsequent days and weeks, the bulk of the remaining nitrogen of the fertilizers of the invention gradually releases into the soil. Sun, heat, water and/or microbes in the soil act on the fertilizer and slowly break down the ionic bonds releasing available nitrogen to the roots of the plant. Preferably, the nitrogen release is about from about 1% to 5% per week, and more preferably from about 2% to 4% per week. A small amount of nitrogen may be covalently bound to compounds of the fertilizer, and thereby remain unavailable to the plant. Preferably this amount of unavailable nitrogen is 5% or less, more preferably 2% or less, and more preferably 1% or less of all nitrogen of the fertilizer product. This dual nitrogen-release profile is unavailable with conventional fertilizers.

Figure 7:
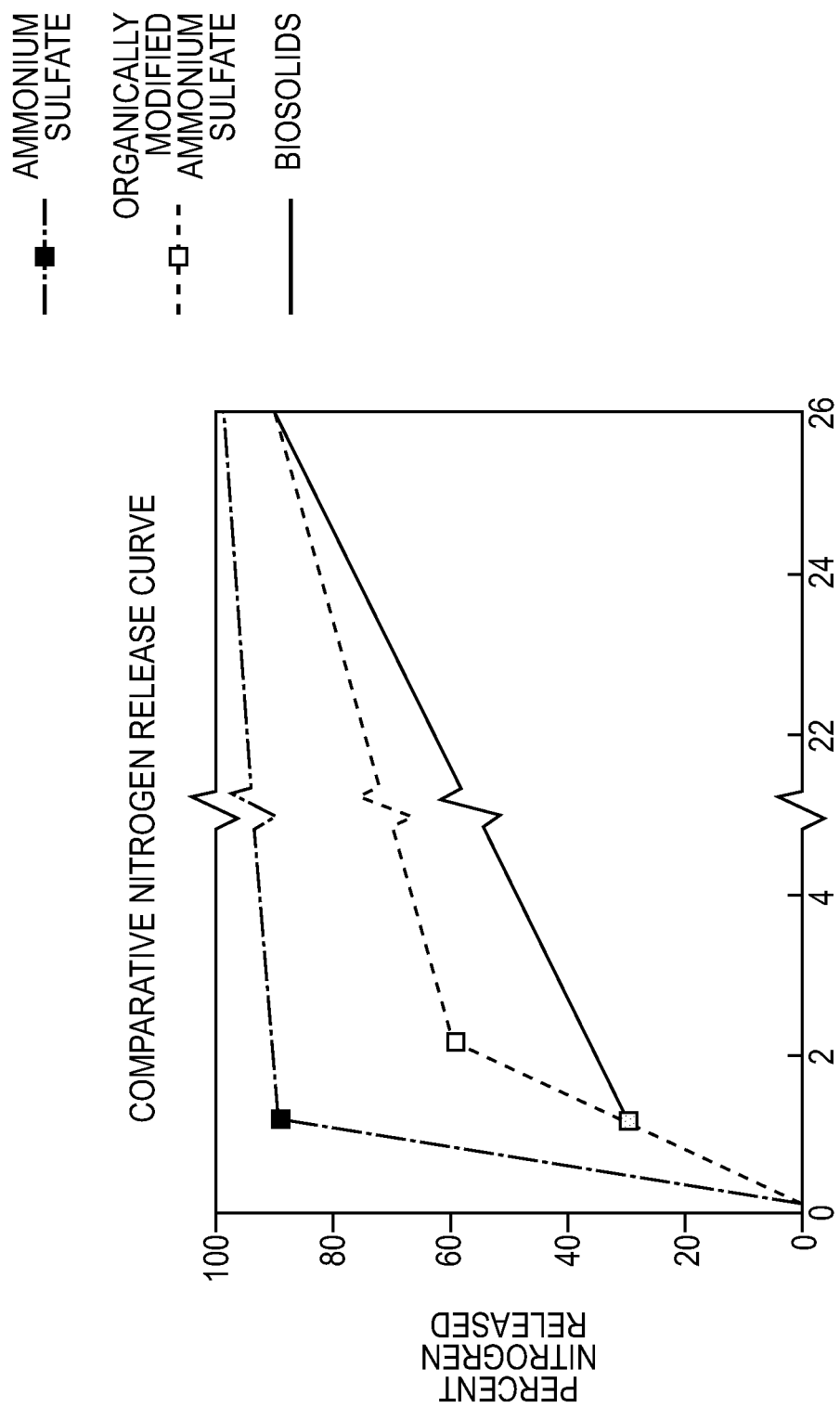
FIG. 7. Academic nitrogen release curve of plants fertilized with ammonium sulfate, organically-modified ammonium sulfate of the invention, and biosolids showing percent nitrogen released into soil over number of weeks.

Dual release fertilizers of the invention allow for a single application of fertilizer that provides a bolus of nitrogen to growing or emerging plants such as commercial crops (e.g., fruits, vegetables, grains, trees), then a continued amount preferably over an entire or part of a growing season (e.g., see FIG. 7). This minimizes the number of fertilizer applications needed per crop which provides substantially savings in application expenses.

Another embodiment of the invention is directed to a process for manufacture of a fertilizer with a predetermined content of one or more of nitrogen, phosphate and/or potassium. Processing of organic materials proceeds as described herein wherein the acid selected is of the type and amount desired in the final fertilizer product. For example, using a set amount of phosphoric acid will result in a set amount of phosphate in the final fertilizer product. By using a particular amount of sulfuric acid, a particular amount of sulfur will be retained in the fertilizer. By selecting the type and amount of acid, one can pre-select the content of the fertilizer product produced. Preferably, the fertilizer is supplemented with one or more plant nutrients added during one or more steps of the processing. The one or more plant nutrients include, but are not limited to urea, ammonium nitrate, ammonium sulfate, monoammonium phosphate, diammonium phosphate, urea ammonium nitrate, liquid urea, potash, iron oxide, soluble iron, chelated iron, micronutrients like magnesium, manganese, copper, zinc, molybdenum or boron, and combinations thereof.

Another embodiment of the invention is directed to a system for the manufacture of a fertilizer. The invention comprises a mixer that blends the organic component containing biosolids, optionally with an odor control agent. The mixture is then heated either in this mixer or in a separate heating vessel. Heating the mixture preferably involves continuous mixing or agitation during the addition of heat either through indirect heating, e.g., heated container walls or heated mixers, or direct heating, e.g., injection of steam or heated air. The heated mixture is then transferred to a first pressure vessel. The pressure vessel is preferably of a construction that allows for a vigorous mixing with continuous exothermic reaction with the conditioned acidic biosolids paste. An agitator/mixer is incorporated into the first pressure vessel. Optional heating elements that may be external to or internal within the vessel may also be incorporated into the pressure vessel. Acid may be blended directly with the heated biosolids in the first pressure vessel or, preferably, the acid and heated biosolids are combined in a mixing tee and together added to the pressure vessel. Within the pressure vessel heat and pressure buildup is continued for a period of time to form a liquid from the paste-like biosolids mix. The liquid mix may be further treated in the same pressure vessel, or preferably transferred to a second pressure vessel through a pipe or conduit. The mix is preferably transferred in a turbulent flow so as to prevent or minimize the possibility of biosolid material remaining in the conduit. Also preferably, the acidified liquid mix is combined in a mixing tee with the ammonia from an ammonia source, preferably liquid ammonia, and together forcibly injected to the second pressure vessel. Preferably the liquid mix is forced through the conduit by pressurized gas that is added to the system behind the liquid mixture to ensure that all of the liquid mix has been transferred to the second vessel. Preferably the gas, which may be air or another gaseous compound or mixture, is purged by way of a relief valve in the second vessel. Within the second pressure vessel, the acidified and nitrogen-fortified liquid mix exothermically heats to and/or is heated to a second predetermined temperature and pressurized to a second predetermined pressure for a second period of time. Preferably the ammonia source is liquefied and/or vaporized ammonia under pressure. Also preferred, is a system whereby the first and second pressure vessels each contain an agitator or other mechanism that continually mixes the mixture. Alternatively, the first and second pressure vessels may be the same. Following ammoniation, the mixture is transferred to a pugmill or granulator wherein the steam and water vapor is released and the ammoniated liquid is mixed with preformed granules (commonly referred to as "recycle" to form or shape the new fertilizer granules. These granules are then heated in a rotary dryer or fluidized bed dryer to form dried granules of the fertilizer. In a preferred embodiment, the entire reaction process is controlled by a closed loop computer control that continuously monitors and adjusts the exothermic reaction through addition of sulfuric acid, ammonia, plant nutrients, pH adjusters and pressure control. The preferred control mechanism is through adjustment of the head space pressure above the biosolids in this pressure vessel. The system also preferably contains a conveyer (e.g. pump or screw conveyer, conveyer belt) for transporting biosolids to the mixer and another pump for transporting the blended biosolids to the first pressure vessel; a pressurized piping system that transports acidified biosolids from the first pressure vessel to the second pressure vessel, ammonia into the second pressure vessel; and disperses the ammoniated liquid to the granulator. Thus, the entire process is carried out without the need for stopping the continuous flow of biosolids into and out of the pressure vessels.

From the granulator, or incorporated with it, is preferably a rotary dryer or alternatively a fluidized bed dryer that further dries the biosolids fertilizer to less than 1 percent water content. Upon exiting the dryer the biosolids fertilizer is further screened for size and separated into product, undersize and oversize granule groups. The undersized particles are recycled back into the entrance of the second pug-mill. The oversized particles are sent to a hammer mill where they are crushed and then recycled. After leaving the screening process the biosolids fertilizer granules are processed through the rotary cooler where the biosolids fertilizer is cooled. Optionally, the cooler may include an ozone generator that provides ozone to the cooling fertilizer. In the presence of ozone, odor-causing material complexes with oxygen and possible other molecules present in the biosolids and substantially reduces or eliminates disagreeable odors. The fertilizer granules empty into the final polishing screens to remove undersize granules or dust created in the cooling process. After processing through the polishing screens, the product passes through a coating drum where a coating agent that inhibits dusting is added. The biosolids fertilizer is then warehoused ready for bulk shipping or subsequent packaging. Alternatively, granules may be subject to an air polishing system that continuously recycles the hot air generated in the cooling process to the drying stage resulting in a reduction in fuel usage and waste air for processing. The air drawn from the screens and equipment is cleaned in a dust collector, cooled through a heat exchanger and reused as inlet air to the cooler. The heated air discharging from the cooler is again cleaned in a dust collector. The cleaned, heated air is used as inlet air for the rotary dryer. The system also preferably contains one or more screens for selecting granules of a predetermined size and a rotary cooler for cooling and polishing the sized granules. The system of the invention preferably comprising a dust control apparatus such as, for example, vacuums and baghouses that collect dust from the granulator and also a water recovery system whereby water extracted from biosolids during processing is recovered and recycled rendering the system very efficient.

In a preferred embodiment, process air is acid scrubbed to remove any fugitive odorants and especially vaporized or gaseous ammonia. The captured ammonia, as an ammonium salt is mixed back into the biosolids mix prior to its entering the reaction vessel or mixer thereby increasing the efficiency of the entire system and maximizing the final nitrogen concentration in the finished fertilizer. Miscellaneous residuals including dust, non-specification or reclaimed product and dried fertilizer that is too small or undersized or oversize material that is crushed in a crushing or mill apparatus or may include other additives, e.g., iron that a customer would prefer can be added to the composition of the finished fertilizer are added to an optional pug-mill or mixer positioned downstream from the pressure vessel or directly into the granulator. During the granulation process, a hardener or hardeners which help to agglomerate the mix and contribute to the hardness of the dried pellet or granule are added at the second pug-mill or granulator. The hardener or hardeners are selected from the group comprised of attapulgite clay, lignin, industrial molasses, and alum among others or mixtures of these hardeners as known by one skilled in the art.

Optionally, dependent upon the requirements of the customer, additional plant nutrients, for example, potash or other forms of potassium, e.g., potassium hydroxide, are preferably added at the pug mill or granulator. The solid nutrients that may be added also comprise urea, ammonium nitrate, monoammonium phosphate, diammonium phosphate, zinc chloride, and/or potash. Also added in this second pug-mill is any additional iron required. The iron contributes an important and valuable plant nutrient to the fertilizer mix.

Also, additional ammonia may be sparged into the pug-mill and into the granulator directly to complete the formation of the ammonium salt and to control the pH of the mix and to facilitate the formation of the finished granule. The solids used to adjust the pH may also be principally alkaline agents selected from the group comprised of calcium carbonate, sodium hydroxide, calcium oxide, cement kiln dust, lime kiln dust, Class C fly ash, Class F fly ash, multistage burner ash, alum, alum biosolids from water treatment and wood ash. These are added via screw conveyors at specific rates for each compound. The liquid additions also include pH adjustment materials such as acids, e.g., phosphoric acid or sulfuric acid, or caustic solutions, e.g., sodium hydroxide. These are pumped at respective rates to the injection ring to enter the pug-mill.

The fertilizer product of the present invention preferably has a pH of between 5.0 and 7.0, more preferably between pH 5.8 and pH 7.0, and more preferably between pH 6.2 and pH 6.9. The remainder of the processing for shaping as in pellet or granule production includes standard fertilizer granulation technology especially for high volume throughput plants. The pellet or granule product, especially in smaller throughput plants considered to be those of less than 25 tons product production per day, may involve more innovative technologies such as injection or extrusion followed by milling or spherulizing the pellet or granule or involves simple discharge from a granulator or granulating pug-mill. When a granulator or granulating pug-mill is used, it is preferable to feed some recycle, as in dry seed material, i.e., dry fines and fines produced by the crusher or mill or sub-specification or reclaim material of the fertilizer product, into the pug-mill and the granulator to adjust the percent moisture present in the mix so that agglomeration or nucleation can occur resulting in granule formation.

Other preferred embodiments comprise adjustments to the processes disclosed herein. Embodiments incorporate a pelletizer in place of the granulator in the process train. The pelletizer may include the drying step to the preferred dryness or the formed pellets may then be transferred to a dryer, preferably a fluidized bed dryer to reach the preferred dryness. These other embodiments may also incorporate adjustments to control pH, dryness, nutrients in the product, shape, concentrations etc. to produce a plethora of fertilizers specific for different plants such as roses, rhododendrons, and any other flowers, vegetables, herbs, as well as products such as cat litters. Adjustments can also be made according to the geographic area in which the product is to be applied, to vary, for example, nutrients that may be inherently or otherwise missing in the location. Examples of such variations include the addition of calcium, potassium or phosphorus in different amounts.

Normal drying for final drying is conducted using a horizontal fluidized bed dryer, or a rotary drum dryer. The dried pellets or granules which are greater than 92 percent solids and preferably are greater than 95 percent solids and more preferably are greater than 98 percent and even more preferably are greater than 99 percent solids are then sized through one or more screens. The specification size may be varied dependent upon customer requirements, however, the range of suitable product for sale is between 0.5 mm and 4 mm with the commercial range for normal sized fertilizer is between 2 mm and 3 mm. The present invention also can manufacture a minimal sized product suitable for use in golf course applications which ranges from 0.5 mm to 1.3 mm. The proper sized material is separated and then cooled and then coated and then cooled in an apparatus, preferably a rotary drum, to less than 60 C (140 F), preferably to less than 49 C (120 F) and more preferably to less than 43 C (110 F). Cooling the granule or pellet optimally occurs in a rotary drum apparatus using ambient air or cooled air as from an ammonia evaporation cooler. Coating may occur in a coating vessel specifically for that purpose typically a rotary drum or a mixer. Alternatively, cooling and coating may be accomplished in a single vessel which cools the material and mixes the coating agent with the granules. Coating is with a de-duster or glazing material which minimizes dust generation during transport, storage and application. The finished coated granule or pellet is then conveyed to storage as finished high nitrogen containing bioorganic-enhanced inorganic ammonium fertilizer until shipment from the manufacturing site. Properly coated and dried pellets or granules have a hardness of greater than 5 pounds crush resistance in order to resist dusting and handing during transport, shipment and application. The de-duster coating or glazing material often requires a higher temperature, often 71-105 C (160 to 220 F), to maintain a molten condition for application in the coating apparatus.

The granule storage facility or warehouse, usually incorporating bins or silos to contain the granules, must be dry to prevent agglomeration of the granules leading to degradation and destruction. The finished product is upon manufacture a sterile fertilizer having substantially no detectable amount of viable microorganisms, such as $E.\ coli$ or streptococci, harmful to animals or humans. Substantially no viable microorganisms means that the fertilizer is microbially-safe and has no detectable amount or a detectable amount well below a threshold for safe handling and use of microorganisms originating from the biosolids. Although the fertilizer is rendered sterile during manufacturing, contamination can be expected from air-borne microorganisms or by microorganisms deposited by animal or other contamination during storage or use. In any case, because the fertilizer product is dry and predominantly inorganic ammonium salts will not support microorganism multiplication at a rate which would lead to a public health problem.

During normal operations periodic shutdown plant equipment will be necessary for inspection, repair, or replacement. This is done to different degrees depending on specific situations. In one embodiment, shutdowns are automatic as in an automated command sequence provided by the plant control processor; in another embodiment, the shutdowns are carried out manually.

If a limited shutdown of the process is necessary to a single piece of equipment the flow of biosolids into the reactor vessel would stop Material in the lines prior to the first pressure vessel are evacuated into the organic mixture mixer(s). Material in the pressure vessels and associated piping are evacuated using alternate valve and piping systems and air pressure to the 'recycle' bed of granules in the granulator or if not available to an emergency storage tank system provided for such events. In the pressure vessel, after the fertilizer mix drops to below the normal discharge point, a diverter valve on the discharge closes sealing off the pressure vessel normal discharge. The diverter valve at the bottom of the pressure vessel then shifts, allowing the compressed air entering the head space of the pressure vessel to force remaining material into the return fertilizer mix line. If further cleaning is needed, process water is then injected into the pressure vessel followed by compressed air to purge the water. Cleanout of the granulator, the dryer and all subsequent equipment is performed by running them until the vessels are empty.

The fertilizer of the present invention is preferably chemically adjusted to fit the needs of high nitrogen fertilizer requirements containing significant amounts of phosphate, sulfur and iron to enhance the targeted nitrogen (N) content of between 8 and 18 percent by weight, and preferably 16 weight-percent permitting significant commercial valuation.

Figure 1A:
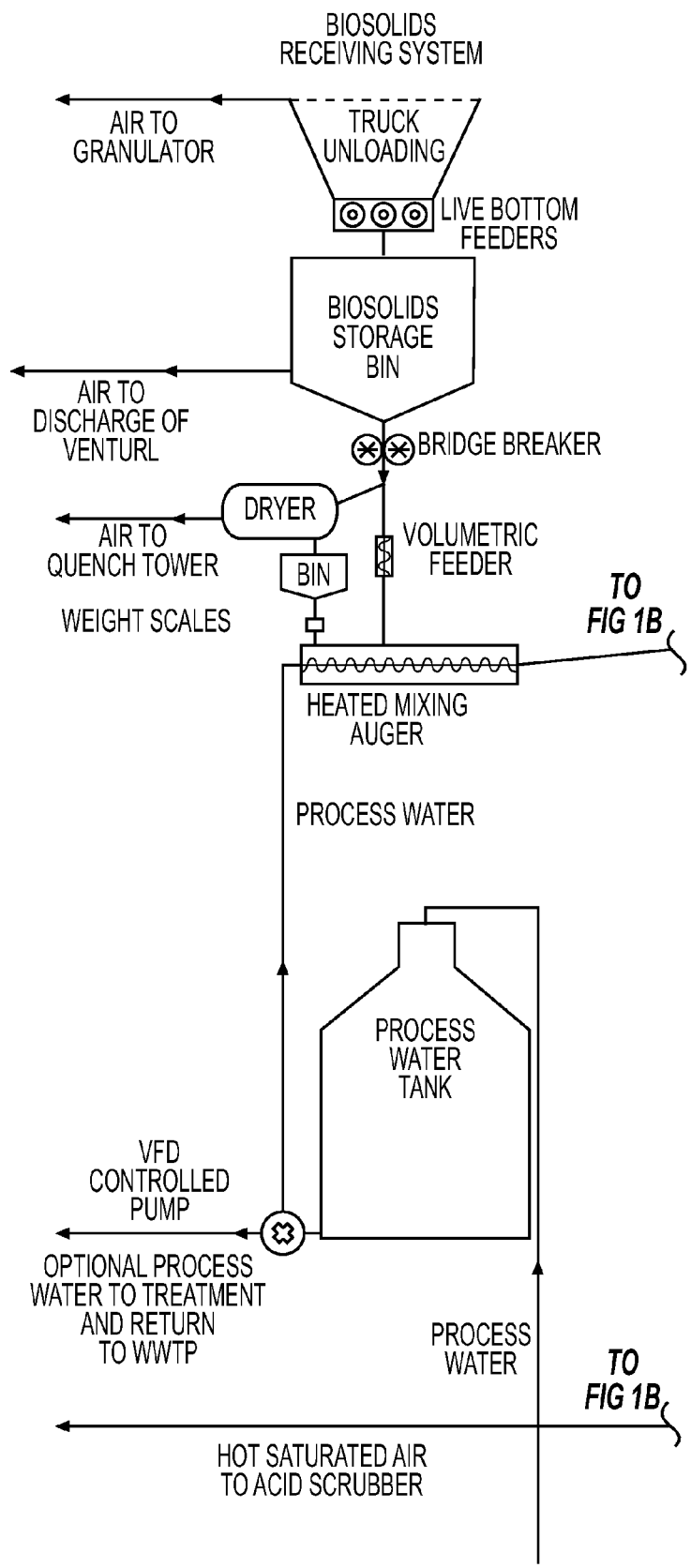
FIG. 1. Biosolid Fertilizer Plant Flow Chart of one embodiment of the Invention.
Figure 1B:
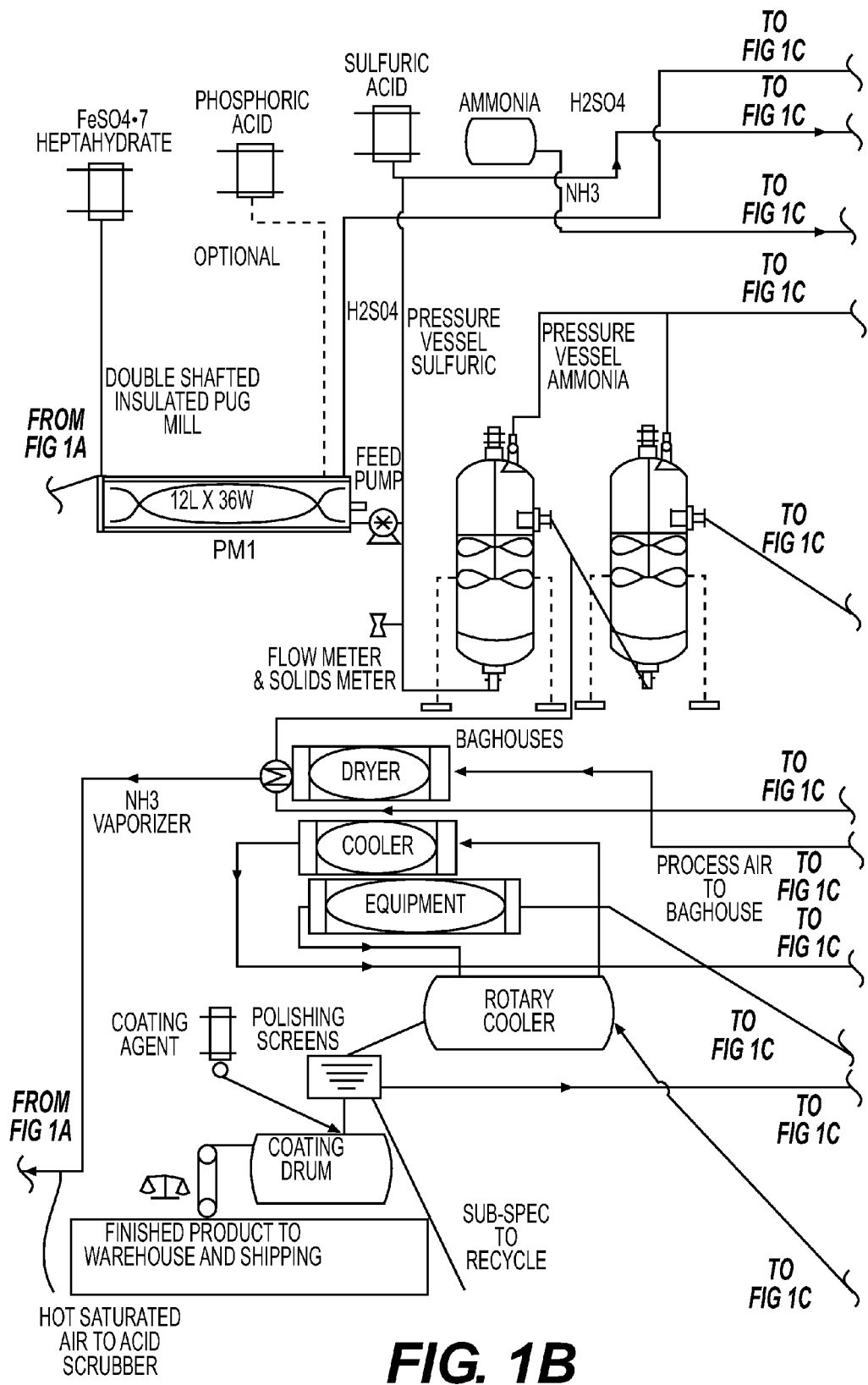
Figure 1C:
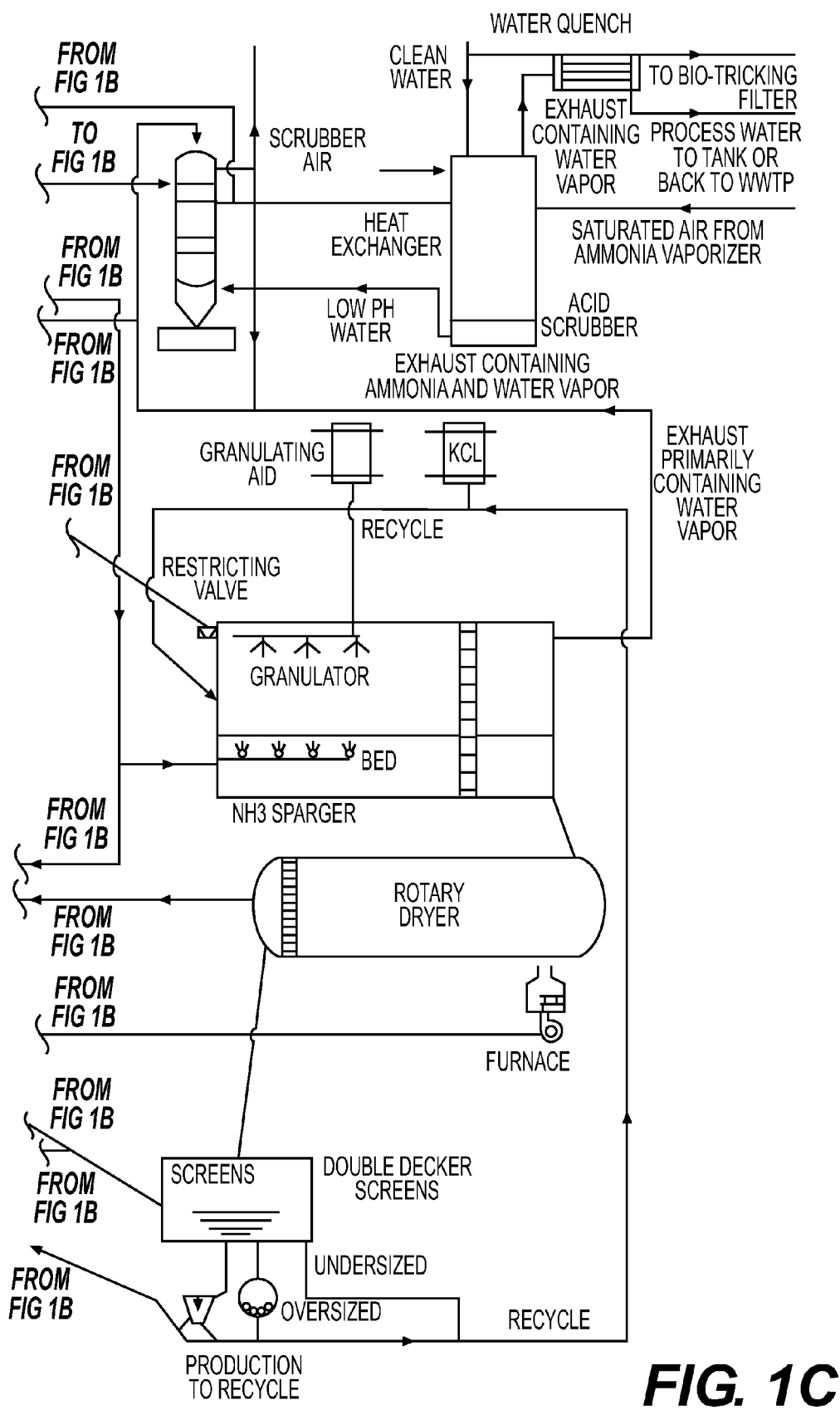
Figure 2A:
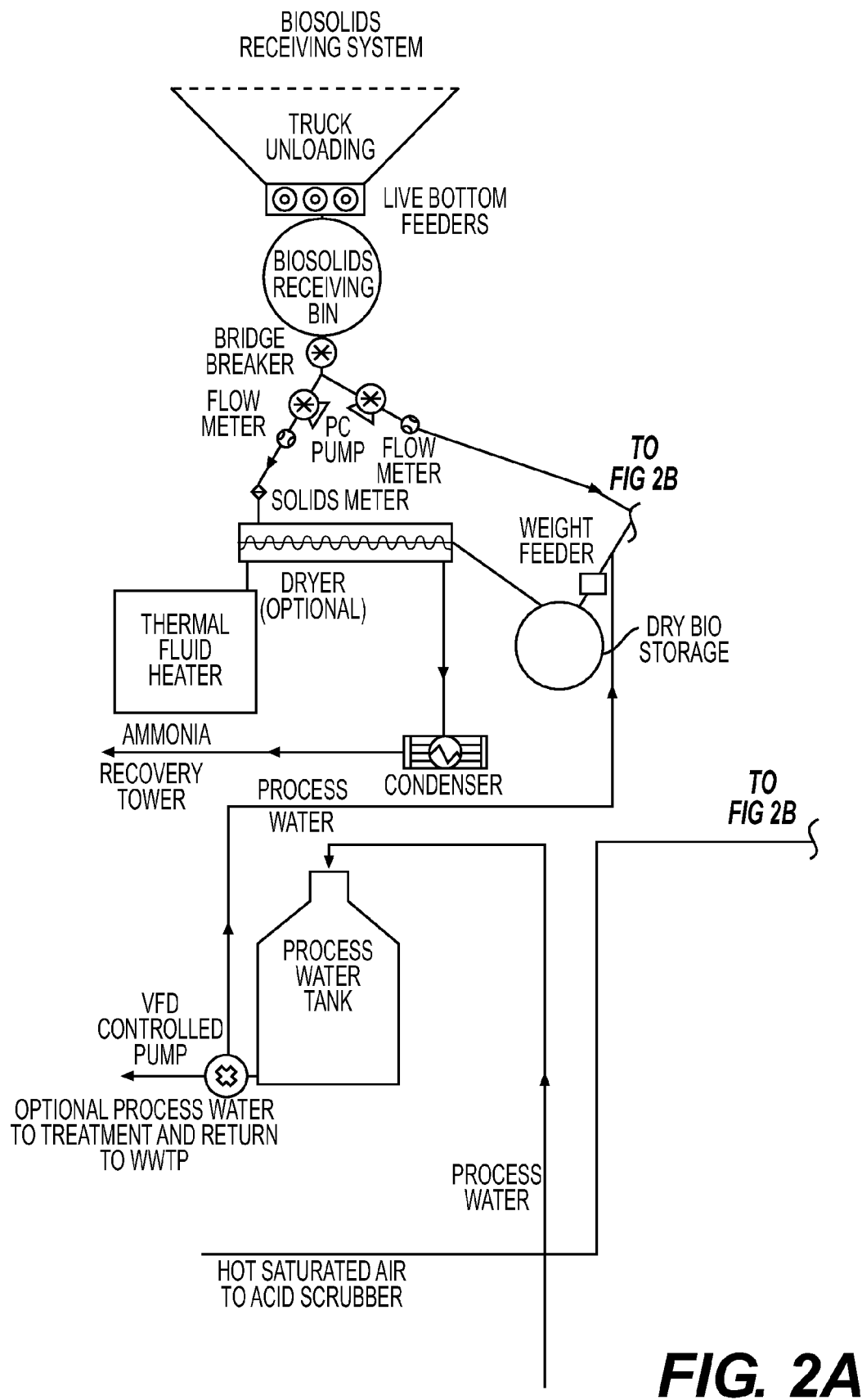
FIG. 2. Biosolid Fertilizer Plant Flow Chart of another embodiment of the Invention.
Figure 2B:
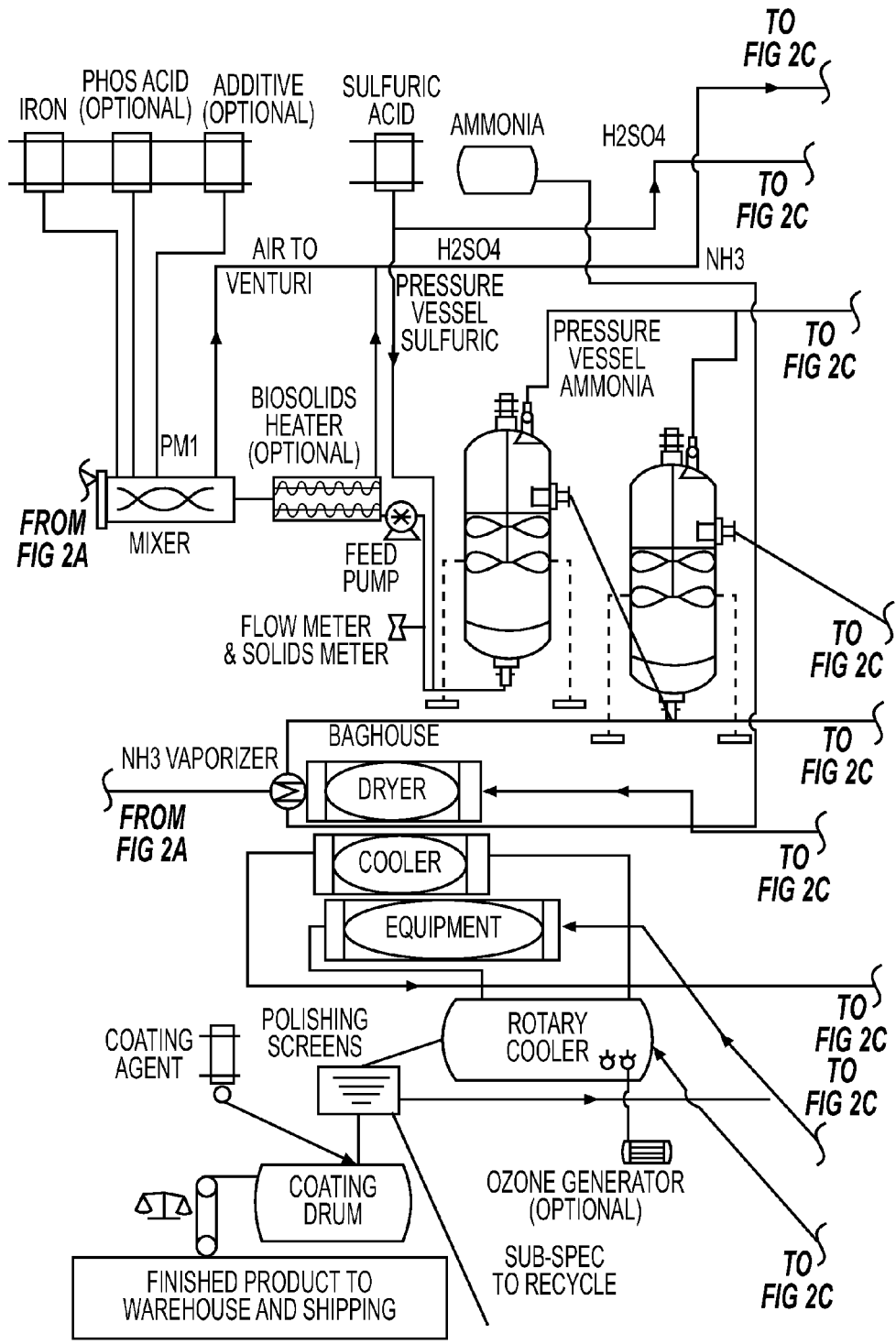
Figure 2C:
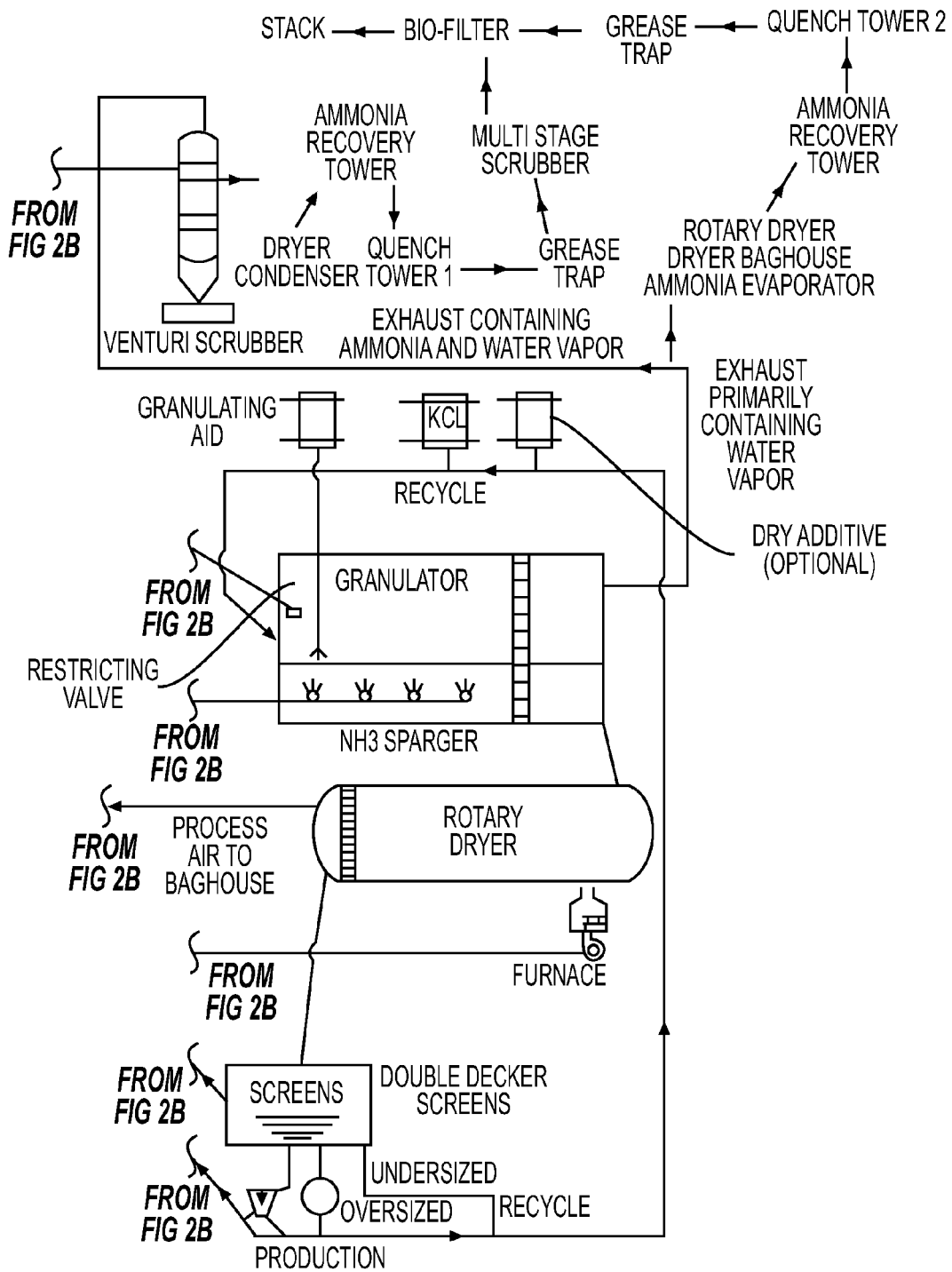

FIGS. 1 and 2 provide schematic diagrams of embodiments of the present invention, wherein the process of these embodiments utilizes dewatered municipal biosolids combined with additional plant nutrients, ammonium salt fertilizers, and binding agents. In this example, the biosolids to be treated is a dewatered biosolids, often referred to as a "biosolids cake." This biosolids are delivered to the manufacturing facility where they are stored in a storage bin until the biosolids are ready to be conditioned. The conditioning initially takes place in a first pugmill by a vigorous mixing or blending with iron or other agent for odor control, along with optional oxidizing agents, which converts the thixotropic biosolids into a pumpable mix, paste, or paste-like mix. The iron and/or oxidizing agent reacts with reduced sulfur compounds and other odorants present in the biosolids. If phosphoric acid is added to this first pugmill it assists in modifying odorants present in the biosolids and contributes the majority of the phosphorus nutrient found in the final product. As the biosolids proceed through the equipment train additional plant nutrients can be infused into the mix. In this embodiment biosolids are heated during their passage through the pugmill prior to being pumped to the first reaction vessel. In the preferred embodiment shown here two sulfuric acid streams (in a concentration range of 68 percent up to 105 percent sulfuric) are injected into the vessel where the mix is acidified and liquefaction commences. Once the mix exits the first pressure vessel it is transferred under pressure into a second pressure vessel where the primary nitrogen infusion reaction occurs. In this figure, a sparger injects ammonia (or other nitrogen source) as a gas or liquid. This reaction in both vessels is carefully controlled to optimize temperature, pressure, retention time, pH, and nitrogen, all of which can be empirically determined based on the input biosolid materials and the desired output content of treated and dried biosolids. The pressure vessels include a plurality of valves and controls that serve to automate the system. Additives can be used to control the temperature, pressure, and pH and nutrient levels. The nitrogen source that is pumped into the pressure vessel comprises a base, such as anhydrous or aqueous ammonia. A mix of biosolids and ammonium sulfate and ammonium phosphate is formed that becomes molecularly integrated in that the ammonium ions become electrically bound to the amphoteric organic molecules from the biosolids thereby creating a slow-release or controlled-release nitrogen in the final fertilizer granule. Similarly, this electric bonding can occur between the sulfate and phosphate and iron molecules present in the mix thereby rendering these nutrient molecules similarly to a slow-release or controlled release state. This mix is maintained in a stress condition for a retention period as determined by its retention time (which in turn is based on the head pressure and volume as described herein) as the mix moves through the pressure vessel. The stress condition preferably includes elevated temperature, and/or elevated pressure. The elevated temperature is produced partly or entirely by the exothermic reaction of the components, which can increase the temperature of the mix. At these temperatures steam is generated from the mix. This steam is allowed to exit the pressure vessel under valve-controlled release, accomplishing a partial drying of the mix. The stress condition the biosolids undergo in the pressure vessel and the retention period are controlled so as to result in the production of a mix that is sterile and that contains hydrolyzed macromolecules from the biosolids. Control of the stress condition and the retention period also results in the fusion of the ammonium ions formed with the organic molecules present creating a natural slow-release property for the nitrogen present, and the denaturization and or hydrolysis of many macromolecules present in the biosolids, such as proteins, plastics and other polymers. When such molecules are biologically active, this denaturization and/or hydrolysis renders them less active or inactive thereby creating a safer mix for public usage or exposure. The retention time to induce the necessary fertilizer properties and biological inactivation are controlled by the continuous pumping and flow of the biosolids into the pressure vessel. This continuous flow processing of the invention versus the traditional batch processing of older plants aids the high throughput of this invention. The continuous flow also minimizes the problems associated with clogging of the process necessitating down time to clear the clog.

The new liquid biosolids mixture flows from the pressure vessel and, optionally, is mixed with a hardening agent or agents and possibly additional nutrients to fine tune the fertilizer as desired. That mix is further treated by granulation or extrusion into granules such as pellets or other, smaller structures. The granules are dried in rotary dryer and passed through one or more screens to separate oversized materials and undersized materials from proper-sized materials. The oversized materials can be crushed in a crusher or mill. Subsequently, the undersized materials and the crushed oversized materials can be recycled to facilitate the granulation of the fertilizer mix. The resulting proper-sized granules are then dried in rotary cooler, sized, coated, cooled and stored. When a traditional granulator is used in the shaping process, ammoniation by vaporized ammonia and recycle addition may occur. Water removed from the mix as steam from the pressure vessel and from subsequent vessels as steam and/or water vapor may be condensed and preferably returned to the wastewater treatment plant (WWTP), or may be treated and discharged into adjacent water resources, or into the atmosphere. Water that is retained from the capture of ammonia in the process emission air is returned to a process water containment vessel. For optimal odor control of the process and optimization of the odor of the resultant fertilizer from the present invention this process water may be treated with 25 percent to 50 percent liquid hydrogen peroxide to eliminate most of the chemical odorants associated with this process water before it is subsequently added to the biosolids mix immediately prior or in the first pugmill. Alternatively, the odorous process water can be treated with gaseous ozone which is bubbled by diffuser through the process water thereby also eliminating the majority of odorant associated with this water.

In another embodiment a series of reaction vessels may be used to accomplish the acid/base reactions described herein. In a preferred embodiment of the present invention the sequence of two reactor vessels can be utilized. In one optional embodiment a combination of one reactor vessel for acid reaction can be followed by an ammoniation conducted in a pipe-cross reactor. Alternatively in another embodiment the reactions could be carried out in the sequence of a first pipe-cross reactor for acidification of the biosolids mix followed by the ammoniation conducted in a pressure vessel. Also described is an embodiment whereby the acidification reaction is conducted in a first pipe-cross reactor followed by the ammoniation reaction in a second pipe-cross reactor.

Another embodiment of the present invention can have the acidification of the biosolids mix to partly or fully occur in the first pugmill. The partly or fully acidified biosolids mix could then be treated by ammoniation in a first reaction vessel. If the mix were partially acidified the acid/base reaction could then be completed in this first vessel or the incomplete mix transferred to a second reactor vessel (or pipe-cross reactor) for completion.

Another embodiment of the invention is directed to a system for the manufacture of a product from organic materials treated in accordance with the method of the invention as described herein. The combination of pressure, heat and ammonia treatment destroys or otherwise inactivates toxins and other hazardous compounds that are present in an otherwise contaminated organic material. The resulting product may be used as a fertilizer or other nutrient or support for plants and/or animals, or in another industry such as, for example, construction or habitat creation.

The following examples illustrate embodiments of the invention, but should not be viewed as limiting the scope of the invention.

EXAMPLES

Example 1

To 900 grams of raw biosolids with a solids content of 16 percent were added 15 grams of process water, 38.6 grams of iron sulfate, and 21.8 grams phosphoric acid. The mixture was thoroughly mixed (10 rpm) to a viscosity of about 1,250 cP, and then heated in an agitated pressure vessel to about 54 C (130 F) and vented to maintain atmospheric pressure of 0 psig (ambient). 411.4 grams of 93 percent sulfuric acid were added to the heated mixture and allowed to attain maximum temperature for 5 minutes. The temperature of the mixture rose to about 104 C (220 F) and the vessel was vented to maintain atmospheric pressure at 0 psig. The viscosity ranged from 760 cP to 3630 cP dependent on induced shear rates.

Example 2

To 730 grams of raw biosolids with a solids content of 23.5 percent were added 56 grams of process water, 45.9 grams of iron sulfate, and 25.9 grams phosphoric acid. The mixture was heated in an agitated pressure vessel to 54 C (130 F) and vented to maintain atmospheric pressure of 0 psig. 490.1 grams of 93 percent sulfuric acid were added to the heated mixture and allowed to attain temperature and maximum pressure for 5 minutes. The temperature of the mixture rose to about 116 C (241 F) and the pressure to a maximum of 40 psig. At the maximum pressure, 165 grams of ammonia were added and the ammoniated mixture allowed to attain temperature and maximum pressure for 5 minutes after which the temperature rose to 183 C (362 F) and the pressure rose to 111 psig. The viscosity was about 518 to 968 cP dependent on induced shear rates.

Example 3

To 720 grams of biosolids with a pH of 6.7 and a solids content of 24.5 percent were added 50 grams of process water, and 47.2 grams of iron sulfate. The mixture was thoroughly mixed and then heated in an agitated pressure vessel until reaching about 54 C (130 F), and a maximum pressure of 26 psig. 503.9 grams of 93 percent sulfuric acid were added to the heated and pressurized mixture. The temperature of the mixture rose to 114 C (238 F) and the pressure to a maximum of 58 psig. After 5 minutes and at the maximum pressure, 170 grams of ammonia were added and the ammoniated mixture was allowed to attain temperature and maximum pressure for 5 minutes after which time the temperature of the mixture rose to 182 C (360 F) and the pressure to 109 psig. The liquefied mixture was then sprayed into a granulator and the entire mixture was dried. The resulting mixture in the granulator contained about 80 percent by weight of recycled fertilizer granules. Granules were sized to about 2 to 4 mm in size and tested for content. Granules were found to contain 16(N)-2(P)-0(K)-175(S)-1(Fe)-15(Org).

Example 4

To 720 grams of biosolids with a pH of 6.45 and a solids content of 23 percent were added 100 grams of process water, and 146 grams of iron sulfate. The mixture was thoroughly mixed and then heated in an agitated pressure vessel until reaching about 54 C (130 F), and a maximum pressure of 23 psig. 406 grams of 93 percent sulfuric acid were added to the heated and pressurized the mixture. The temperature of the mixture rose to 111 C (232 F) and the pressure to a maximum of 34 psig. After 5 minutes at the maximum pressure, 166 grams of ammonia were added and the ammoniated mixture was allowed to attain temperature and maximum pressure for 5 minutes after which time the temperature of the mixture rose to 176 C (348 F) and the pressure to 106 psig. The liquefied mixture was then sprayed into a granulator and the entire mixture was dried. The resulting mixture in the granulator contained about 80 percent by weight of recycled fertilizer granules. Granules were sized to about 2 to 4 mm in size and tested for content. Granules were found to contain 16(N)-0(P)-0(K)-175(S)-3(Fe)-15(Org).

Example 5

To 600 grams of biosolids with a pH of 6.54 and a solids content of 23 percent were added 130 grams of process water, and 158.9 grams of iron sulfate. The mixture was thoroughly mixed and then heated in an agitated pressure vessel until reaching about 54 C (130 F), and a maximum pressure of 21 psig. 511.7 grams of 93 percent sulfuric acid were added to the heated and pressurized mixture. The temperature of the mixture rose to 118 C (244 F) and the pressure to a maximum of 46 psig. After 5 minutes and at the maximum pressure, 183 grams of ammonia were added and the ammoniated mixture was allowed to attain temperature and maximum pressure for 5 minutes after which time the temperature of the mixture rose to 175 C (3347 F) and the pressure to 107 psig. The liquefied mixture was sprayed into a granulator and the entire mixture was dried. The resulting mixture in the granulator contained about 80 percent by weight of recycled fertilizer granules. Granules were sized to about 2 to 4 mm in size and tested for content. Granules were analyzed found to contain 16(N)-0(P)-2(K)-185(S)-3(Fe)-13(Org).

Example 6

Figure 5:
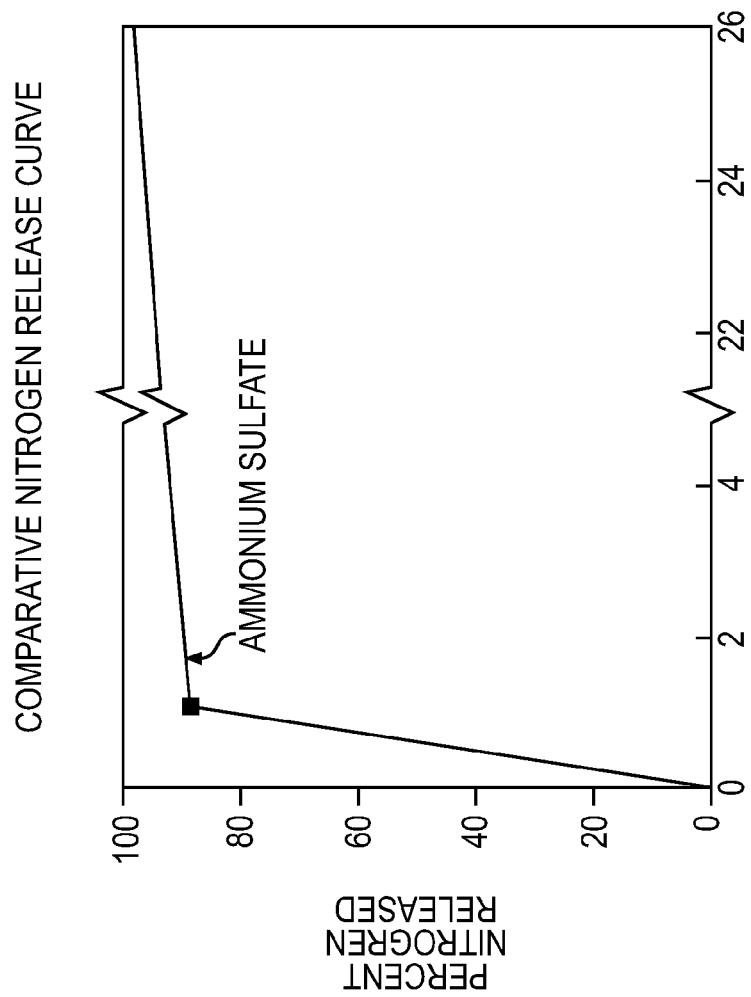
FIG. 5. Nitrogen release curve of ammonium sulfate fertilized plants showing percent nitrogen released into soil over number of weeks.
Figure 6:
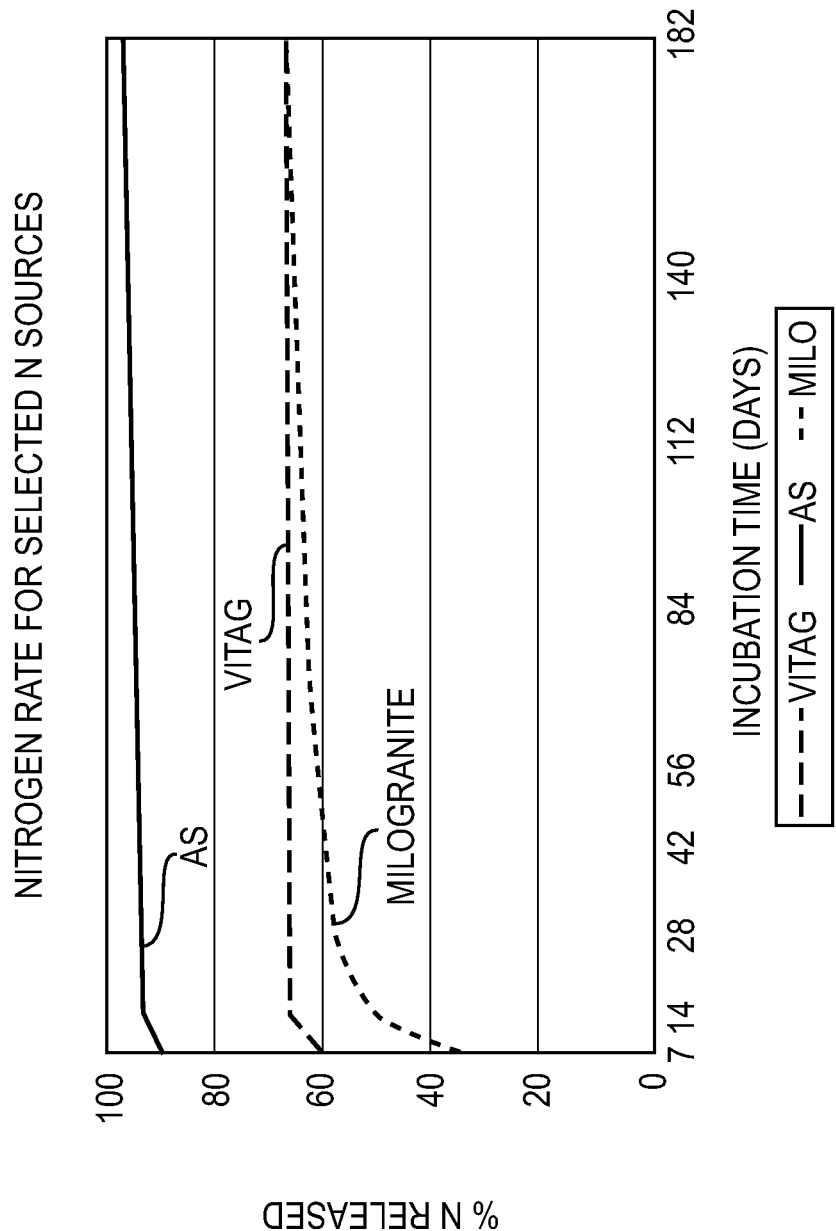
FIG. 6. Nitrogen release curve showing percent nitrogen released into soil over number of days for ammonium sulfate (AS), organically-modified ammonium sulfate of the invention (VITAG), and conventional biomass (MILORGANITE).

Nitrogen release profiles of the organically modified ammonium sulfate of the invention are determined in comparison to traditional, pure ammonium sulfate fertilizer and pure biosolids as controls. First, ammonium sulfate is applied over sterilized sand in a laboratory environment (ambient temperatures with no sun, water or soil organisms) and allowed to permeate the sand over a period of time. As can be seen in FIG. 5, about 90% of the nitrogen of the pure ammonium sulfate fertilizer travels through the sand within less than one week. Next, nitrogen penetration is compared between pure ammonium sulfate (AS), pure biosolids (MILORGANITE), and organically modified ammonium sulfate of the invention (VITAG). As can be seen in FIG. 6, about 90% of the nitrogen of AS is released through the sand within about one week of application. In comparison, about 35% of the nitrogen of traditional biosolids is released which increased to about 70% over two weeks where it remained. Organically augmented ammonium sulfate of the invention released about 60% of its nitrogen within the first week which increased to about 70% over two weeks.

Also, a theoretical nitrogen release profile is determined for these same three fertilizer materials in normal soil. Soil is presumed to contain microorganisms that break down nitrogen-containing molecules thereby releasing additional nitrogen into the soil. As can be seen in FIG. 7, ammonium sulfate again releases its nitrogen content within the first week. Pure biosolids release only about 30% of its nitrogen in the first two weeks, which gradually increases to about 90% over a period of 26 weeks. However, organically modified ammonium sulfate prepared according to the processes of the invention releases just under 60% of its nitrogen over two week which gradually increased to about 90% over the next 26 weeks. Thus, organically modified ammonium sulfate fertilizer prepared according to the processes of the invention initially releases just over half of its nitrogen and slowly releases the remaining half over a period of weeks to months. This two-stage nitrogen release profile (e.g., dual-release, two-step release, combined fast/slow release) is characteristic of the fertilizers of the invention.

Other embodiments and uses of the invention will be apparent to those skilled in the art from consideration of the specification and practice of the invention disclosed herein. All references cited herein, including all publications, U.S. and foreign patents and patent applications, are specifically and entirely incorporated by reference. The term comprising, where ever used, is intended to include the terms consisting and consisting essentially of. It is intended that the specification and examples be considered exemplary only with the true scope and spirit of the invention indicated by the following claims.

The invention claimed is:

1. A method for manufacture of a fertilizer comprising:
providing an organic material containing biosolids wherein the organic material has a solids content of at least ten percent;
adding an odor control agent to the organic material to create a mixture;
adding an acid to the mixture under a first pressure and elevated temperature for a first period of time forming a liquefied mixture;
adding ammonia to the liquefied mixture under a second pressure and elevated temperature for a second period of time; and
processing the liquefied mixture to form the fertilizer.

2. The method of claim 1, wherein the biosolids comprise one or more of municipal biosolids, heat-dried biosolids, pharmaceutical fermentation wastes, microbial digests of organic products, food stuffs, food byproducts, animal manures, digested animal manures, organic biosolids, biosolids containing microorganisms, and combinations thereof.

3. The method of claim 1, wherein the organic material further contains plastic and hair and the method does not require removal of either before processing.

4. The method of claim 1, wherein the organic material is dewatered or hydrated to a solids content of between 15 and 40 percent.

5. The method of claim 4, wherein the organic material has a percent dryness of less than 22 percent.

6. The method of claim 4, wherein a portion of the organic material is dewatered to a dryness greater than 70 or 85 percent, and that portion is blended with the remaining portion of the organic material to achieve a desired percent dryness.

7. The method of claim 4, wherein the organic material is hydrated with process water recovered from one or more steps of the method.

8. The method of claim 1, wherein the odor control agent is selected from the group consisting of calcium ferrate, sodium ferrate, potassium ferrate, ferrous sulfate heptahydrate, rozenite, melanterite, ferric chloride, ferrous sulfate, ferrous sulfate monohydrate, hydrogen peroxide, ozone and salts, derivatives and combinations thereof.

9. The method of claim 1, wherein the mixture of the organic material with the odor control agent is a thixotropic mixture.

10. The method of claim 1 wherein the mixture is heated prior to adding acid.

11. The method of claim 1, wherein heating is performed in a first pressure vessel and the first pressure is maintained at between 20 and 60 psig.

12. The method of claim 1, wherein the first temperature is between 66 C (150 F) and 127 C (260 F) and the first period of time is between 3 minutes and 30 minutes.

13. The method of claim 1, wherein the first temperature is between 93 C (200 F) and 121 C (250 F) and the first period of time is between 5 minutes and 10 minutes.

14. The method of claim 1, wherein the acid is phosphoric acid, sulfuric acid, or a combination thereof.

15. The method of claim 1, wherein the liquefied mixture is at a viscosity of 4,000 cP or less and is transferred to a second pressure vessel.

16. The method of claim 1, wherein the ammonia is heated under pressure to form a gas prior to being added to the liquefied mixture.

17. The method of claim 1, wherein the second temperature is between 121 C (250 F) and 199 C (390 F), the second period of time is between 1 minute and 30 minutes, and the pressure within the pressure vessel is maintained at between 50 and 200 psig.

18. The method of claim 1, wherein after the addition of ammonia the liquefied mixture is at a viscosity of 1,000 cP or less.

19. The method of claim 1, wherein the processing comprises drying the liquefied mixture to a solids content of greater than 92 percent.

20. The method of claim 19, wherein the solids content is at least 98 percent.

21. The method of claim 1, further comprising adding a hardening agent during processing.

22. The method of claim 21, wherein the hardening agent is ligno-sulfonate, molasses, alum or a combination thereof.

23. The method of claim 1, wherein processing is performed in a granulator to form granules.

24. The method of claim 23, wherein the granules are sized and granules of between 0.5 and 4 mm selected.

25. The method of claim 23, wherein granules of greater than 4 mm are crushed and combined with granules of less than 0.5 mm are both are recycled during processing.

26. The method of claim 1, wherein each step of the method is performed in a continuous process.

27. The method of claim 1, further comprise a dust control system that collects dust created by the processing.

28. A process for manufacture of a fertilizer with a predetermined content of one or more of nitrogen, phosphate and potassium comprising:
providing an organic material containing biosolids wherein the organic material has a solids content of at least ten percent;
adding an odor control agent to the organic material to create a mixture;
heating the mixture under a first pressure to a first temperature for a first period of time;
adding an amount of a predetermined acid to the heated mixture, thereby creating an exothermic reaction and forming a liquefied mixture;
adding a predetermined amount of ammonia to the liquefied mixture under a second pressure and heating the mixture to a second temperature for second period of time, wherein the amount of ammonia added is determined from the composition of the organic material; and
processing the liquefied mixture to form the fertilizer with a predetermined content of one or more of nitrogen, phosphate and potassium.

29. The process of claim 28, further comprising adding one or more plant nutrients to the mixture during processing.

30. The process of claim 29, wherein the one or more plant nutrients are selected from the group consisting of urea, ammonium nitrate, ammonium sulfate, monoammonium phosphate, diammonium phosphate, urea ammonium nitrate, liquid urea, potash, iron oxide, soluble iron, chelated iron and combinations thereof.

31. The process of claim 28, further comprising adding and one or more hardening agents during processing.

32. The process of claim 31, wherein the one or more hardening agents are selected from the group consisting of ferric oxides, alum attapulgite clay, industrial molasses, lignin, ligno sulfonate, urea formaldehyde polymerizer and combinations thereof.

33. A method for manufacture of a product comprising:
providing an organic material wherein the organic material has a solids content of at least ten percent;
adding an acid to the organic material under a first pressure and elevated temperature for a first period of time forming a liquefied mixture;
adding ammonia to the liquefied mixture under a second pressure and elevated temperature for a second period of time; and
processing the liquefied mixture to form the product.

34. The method of claim 33, wherein the organic material is a plant or bacterial material.

35. The method of claim 34, wherein the plant or bacterial material is algae, bacteria, fungi or a combination thereof.

36. The method of claim 35, wherein the organic material contains toxic materials and the toxic materials are hydrolyzed or otherwise rendered nontoxic or inactivated.

37. The method of claim 36, wherein the first pressure is between 20 and 60 psig, the elevated temperature is between 66 C (150 F) and 127 C (260 F) and the first period of time is between 3 minutes and 30 minutes.

38. The method of claim 36, wherein the second pressure and elevated temperature for a second period of time are, respectively, between 50 and 200 psig and between 121 C (250 F) and 199 C (390 F), between 1 minute and 30 minutes.

39. The method of claim 36, wherein the product is a fertilizer.

40. The method of claim 36, wherein the fertilizer releases about 40-60% of nitrogen into soil within about 2 weeks of application and most of remaining nitrogen over a period of about 3-6 months.

* * * * *